AUTOMATIC BOWLING SCORE COMPUTER

Original Filed Nov. 4, 1964 5 Sheets-Sheet 1

INVENTORS
WILLIAM D. McJUNKIN
JOSEPH A. WEBB, SR.
By Albert L. Carter
Attorney

AUTOMATIC BOWLING SCORE COMPUTER

Original Filed Nov. 4, 1964 5 Sheets-Sheet 2

INVENTORS
WILLIAM D. McJUNKIN
JOSEPH A. WEBB, SR
By Albert R. Carter
Attorney

AUTOMATIC BOWLING SCORE COMPUTER
Original Filed Nov. 4, 1964 5 Sheets-Sheet 5
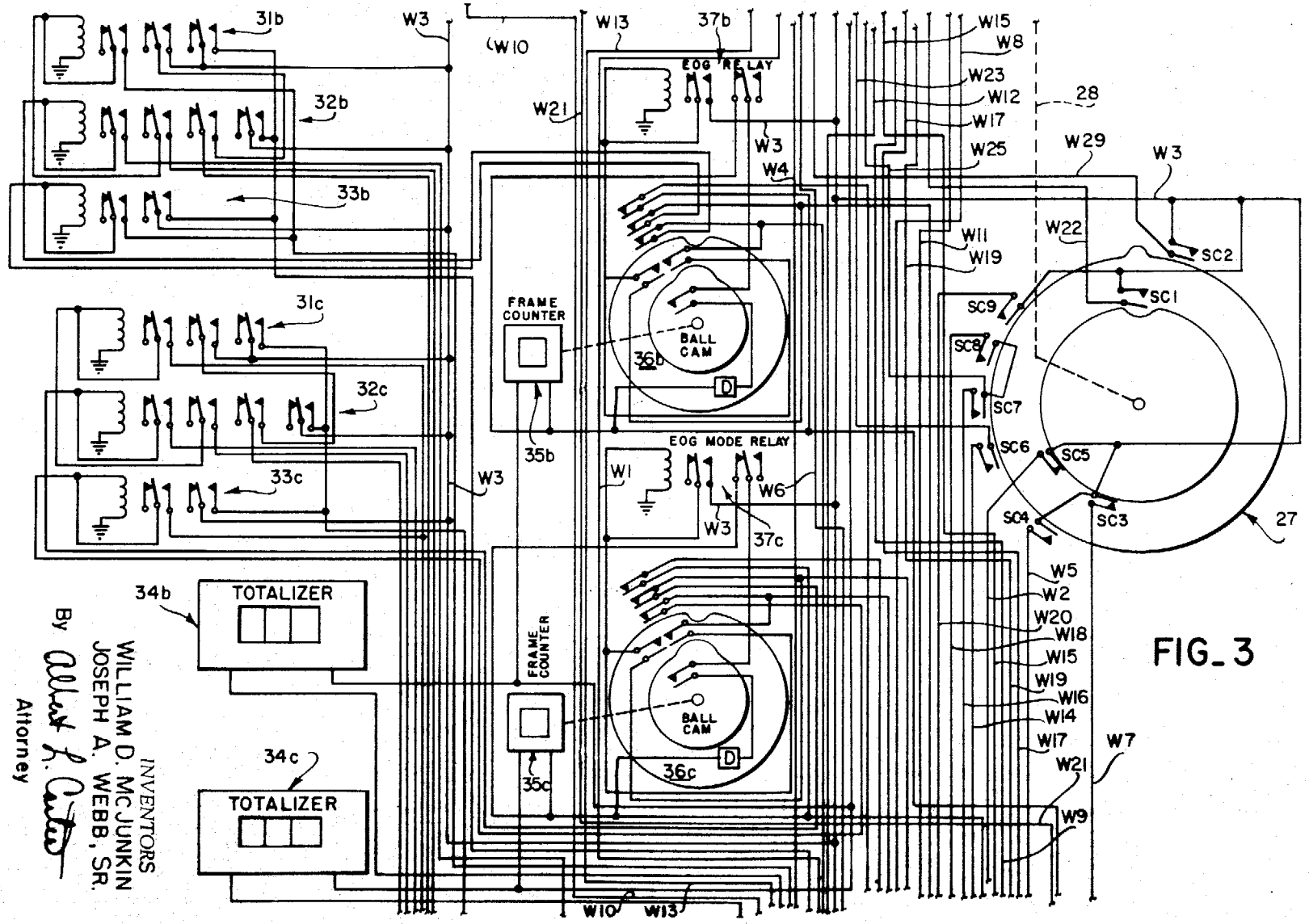
INVENTORS
WILLIAM D. McJUNKIN
JOSEPH A. WEBB, SR.
By Albert L. Carter
Attorney AUTOMATIC BOWLING SCORE COMPUTER
Original Filed Nov. 4, 1964 5 Sheets-Sheet 4
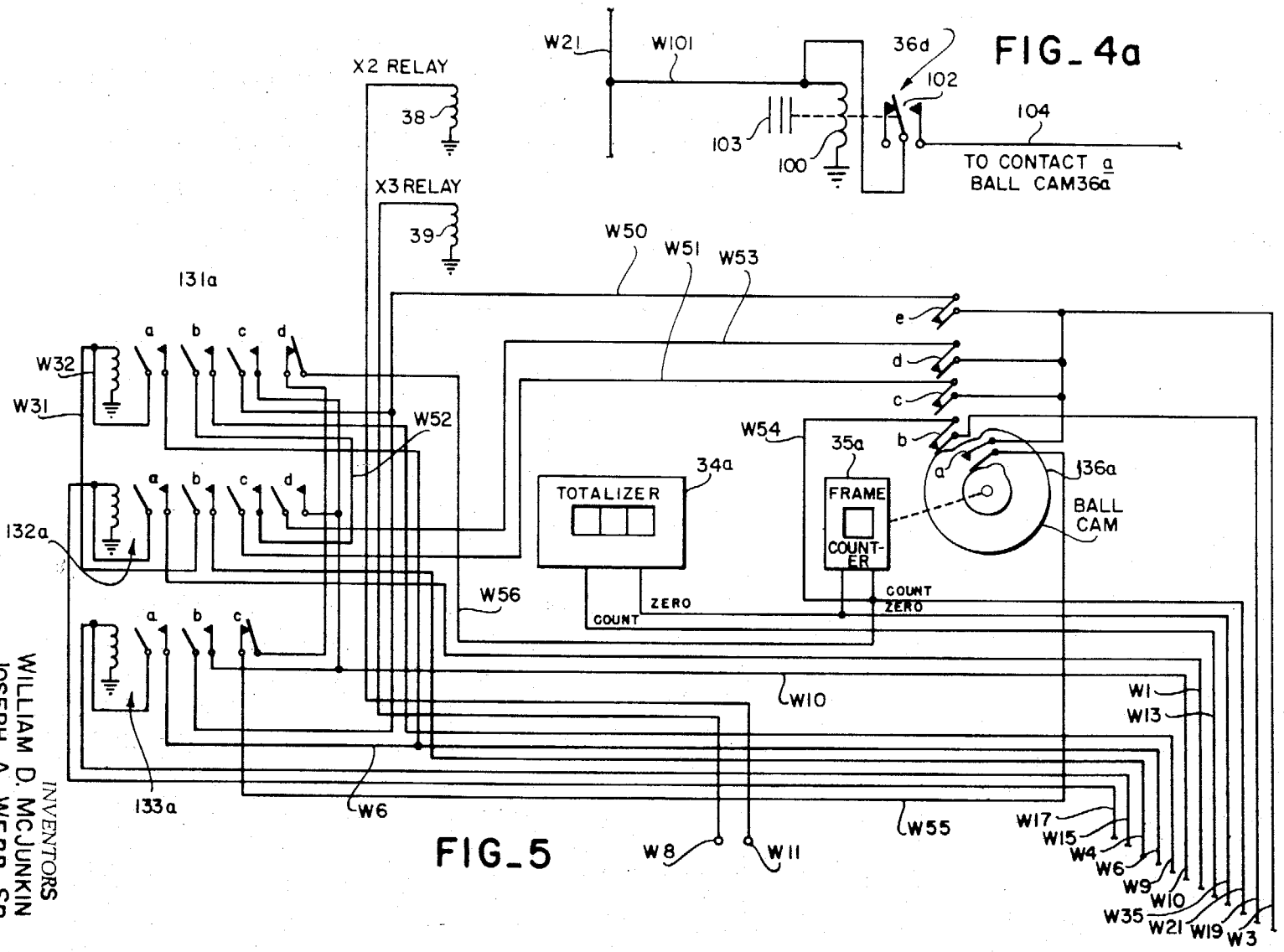
INVENTORS
WILLIAM D. McJUNKIN
JOSEPH A. WEBB, SR.
By Albert L. Carter
Attorney

AUTOMATIC BOWLING SCORE COMPUTER

Original Filed Nov. 4, 1964 5 Sheets-Sheet 5

INVENTORS
WILLIAM D. McJUNKIN
JOSEPH A. WEBB, SR.
By Albert L. Carter
Attorney

United States Patent Office

Re. 27,249
Reissued Dec. 21, 1971

27,249

AUTOMATIC BOWLING SCORE COMPUTER

William D. McJunkin, 2603 Little John Trail SE., Marietta, Ga. 30060, and Joseph A. Webb, Sr., Friendswood, Tex.; said Webb assignor to said McJunkin Original No. 3,385,600, dated May 28, 1968, Ser. No. 408,862, Nov. 4, 1964. Application for reissue May 28, 1970, Ser. No. 41,654

Int. Cl. A63d *5/04*

U.S. Cl. 273—54 C 11 Claims

Matter enclosed in heavy brackets [ ] appears in the original patent but forms no part of this reissue specification; matter printed in italics indicates the additions made by reissue.

ABSTRACT OF THE DISCLOSURE

An automatic bowling score computer for connection to automatic pinsetting equipment and having a separate individual scoring totalizer for each of a plurality of bowlers; the computer including a rotary camming switch adapted to indicate up to a pin count of thirty being added to an appropriate totalizer for each operation of the pinsetting equipment, plus a pair of relays for doubling and tripling the pinfall sensed by the pinsetting equipment for addition of game score to the appropriate totalizer for each operation of the pinsetting equipment. Associated with each individual scoring totalizer is a set of three relays; one being energized during the scoring of the first ball after a spare to operate the doubling relay of the computer, another being energized during the scoring of the first ball after a strike to operate the doubling relay of the computer, and the third being energized during the scoring of the second ball after a strike to operate the doubling relay of the computer. The circuitry of the computer further provides that when the two preceding balls thrown are a strike involving one of the individual scoring totalizers, the scoring of the first ball thrown after the second strike has both second and third individual relays energized which in turn energize both the doubling and tripling relays for tripling the pinfall addition being added to the associated individual scoring totalizer for that ball.

A ball and frame counter is provided with each of the individual scoring totalizers which in turn operates a control means so as to prevent tripling the pinfall of any ball thrown after the first ball of the tenth frame and to prevent doubling the pinfall of any ball thrown after the second ball of the tenth frame, so that each individual scoring totalizer shows a score after each ball is thrown that will be the final score of that game if all subsequent balls thrown in the game score zero.

This invention relates to an automatic bowling score computer for use in conjunction with automatic pinsetting equipment, and more particularly a computer that provides the exact and accurate score after each ball is thrown that would be the final score for the game if all subequent balls thrown thereafter in the game would score zero.

Similar type devices are known in the prior art, such as represented by United States Letters Patent 2,590,444, issued to J. Millman et al. on Mar. 25, 1952, and entitled "Bowling Machine Totalizer." Such prior devices approach the totalizing of the score in the same manner as bowling scoring is *done manually* [donem anually]; namely, withholding the actual score input for frames completed involving a bonus count on a ball or balls thrown in subsequent frames as occurs in the case of a spare and/or strike. This withholding of the score input requires a substantial amount of information storage equipment involving relays and complicated circuitry plus additional memory and signal generating devices when the totalizer is utilized for multiple players on multiple alleys or lanes as occurs in league and tournament bowling; some of the additional memory and signal generating devices being required for each of the number of bowlers involved so as to reestablish the totalizing mechanism to an appropriate state or position after the intervening bowlers have played in order to incorporate the proper bonus counts or pinfalls from spares and strikes.

Through this invention the actual totalizing of the score is accomplished in a different manner so as to minimize the memory storage devices and associated circuitry. This is accomplished by inserting the actual pin fall into the totalizer after each ball is thrown, and upon the occurrence of a spare or strike which represents a bonus count, an appropriate relay or other appropriate type equipment is activated to multiply the pinfall on the subsequent ball or balls, as the case may be, by two or three. Thus, in this manner the score on the totalizer at any time during a game is that score that would be the final score for the game if all following balls to be thrown in that game scored zero pinfall.

Accordingly, it is an object of this invention to provide an automatic bowling score computer that provides an accurate and up-to-date score for each ball thrown by each player.

A further object of this invention is to provide an automatic bowling score computer that provides an accurate and up-to-date score indication after each ball thrown by each player.

Another object of this invention is to provide an automatic bowling score computer providing an actual and up-to-date numerical score for each bowler during a game that would be the final score should all subsequent or following balls thrown by any or all bowlers in that game score zero.

A still further object of this invention is to provide an automatic bowling score computer meeting all the above objects with a minimum of equipment, and hence expense, for a device of this kind.

Other objects and advantages of this invention will become apparent from the following explanation when taken in conjunction with the accompanying drawings in which:

FIGURES 2, 3 and 4 are schematic wiring diagrams of one embodiment of this invention showing the mechanism arrangement and associated wiring for a three-person bowling score computer on one alley;

FIGURE 4a is a schematic showing of the delay mechanism shown in FIGURES 2 and 3;

Figure 2:
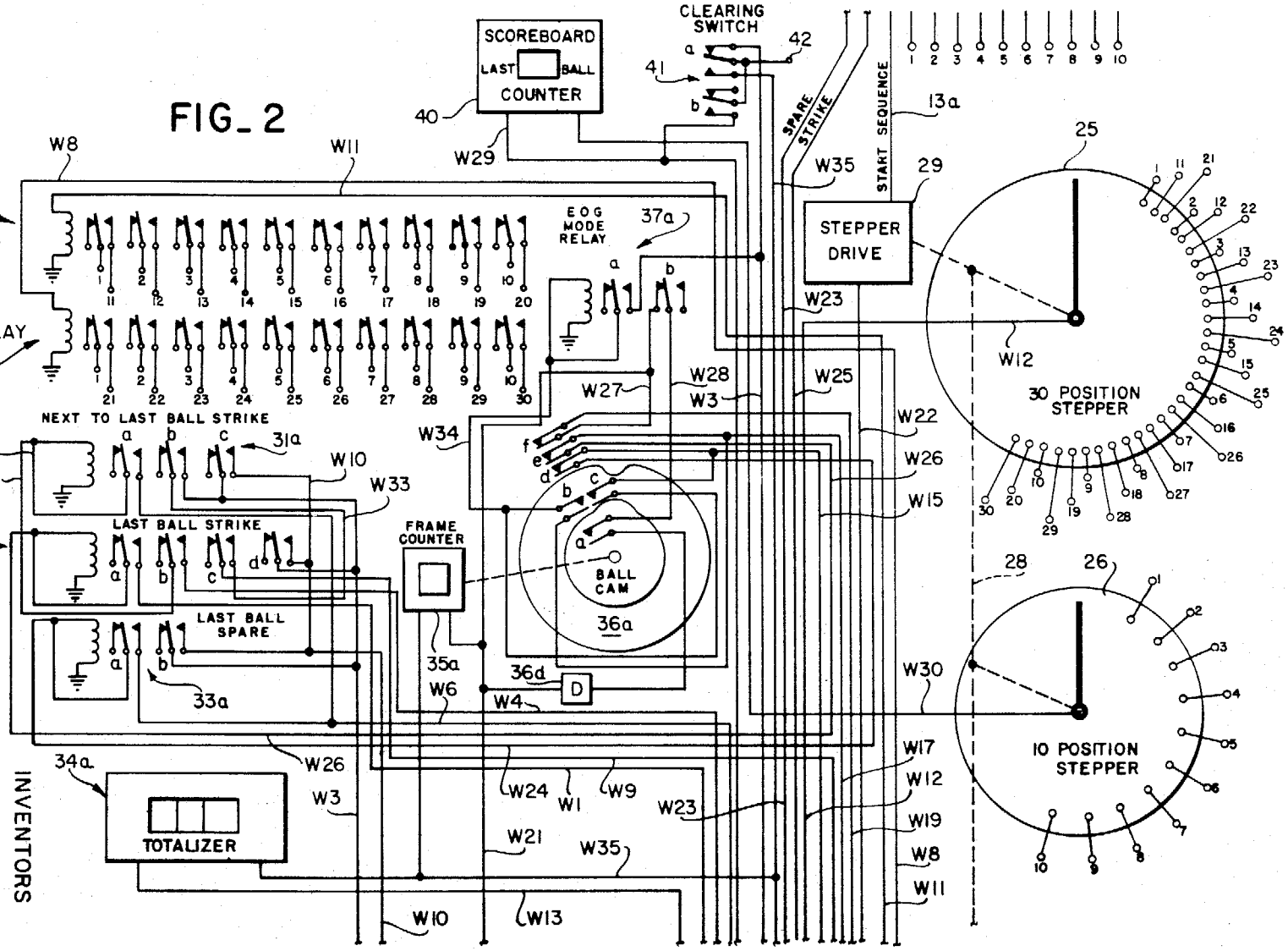
Figure 6:
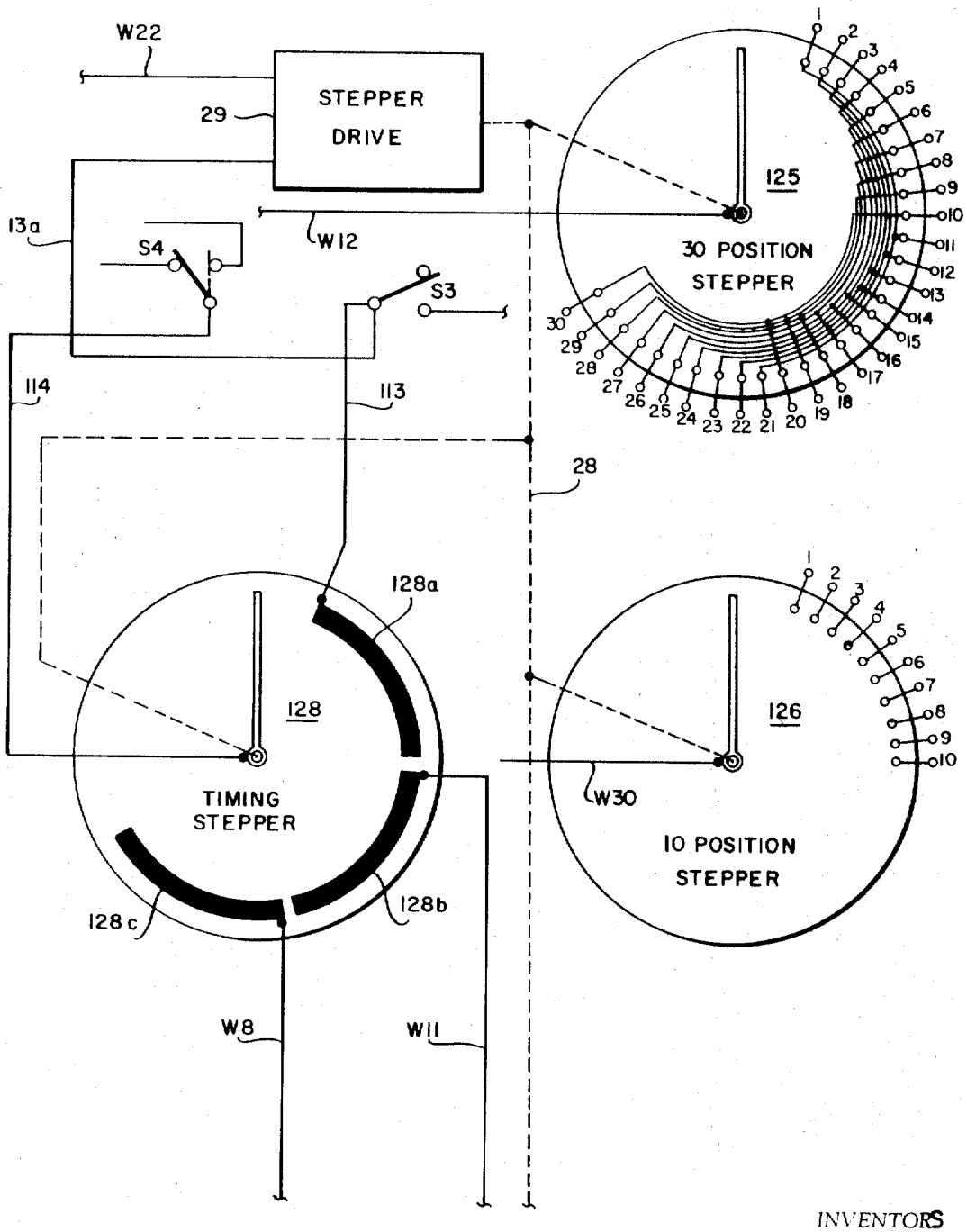

FIGURE 5 shows another embodiment of a portion of the structure shown in FIGURE 2 in which a different ball cam arrangement is provided to handle the special handing and scoring arrangements for the tenth frame without requiring the end-of-game-mode relay of FIGURE 2; and, FIGURE 6 shows still a further embodiment of a portion of the structure shown in FIGURE 2 in which a thirty-position rotary camming switch and a ten-position rotary camming switch different from those of FIGURE 2 are combined with a thirty-position timing stepper in a manner to provide for bonus pin counts.

Generally stated, the invention comprises a bowling score computer associated with automatic pinsetting equipment which senses the number of fallen pins after each ball thrown; this number of pins being counted or added into a totalizer after each ball is thrown. Bonus counts are provided for in bowling as, for example, in the case of tenpins wherein a maximum of two thrown balls per frame are allowed and when all ten pins are knocked down on the first ball (called a strike), the scoring for that frame is 10 plus the number of pins knocked down on the next two balls thrown. In the case of a spare, or when all the pins are knocked down on the two balls thrown in one frame, the scoring for that frame is 10 plus the number of pins knocked down on the first ball thrown in the next frame.

Associated with each player totalizer is a group of three relays which are activated from sensed pin fall information to show any of the three conditions of (a) a spare in the previous frame, (b) the last ball was a strike, or (c) the next to the last ball was a strike, when any of the conditions occur or apply. In one embodiment, this information combined with a thirty-position rotary stepping switch, a ten-position rotary stepping switch, a programming cam, with a pair of multiplying relays all combine to add in an appropriate number of pin impulses or count to the totalizer. In another embodiment, a modified thirty-position switch and a modified ten-position rotary camming stepping switch combined with a thirty-position timing stepper add in a appropriate number of pin impulses or count to the totalizer (the thirty-position timing stepper serving as a replacement for the pair of multiplying relays). In the case of pinfall on a ball that is not to be considered or counted as a bonus, then the number added to the totalizer is the actual pinfall from the ball thrown. In the case of the pinfall following a spare or strike so that the pinfall is to be considered or counted as a bonus, then the number added to the totalizer will be two or three times the actual pinfall, as the case may be. In this manner the totalizer represents after each ball thrown the score or pin count that would be the final score of the game if every remaining ball required to be thrown to finish the game scored zero.

For an example, suppose that in the first frame of a game, the bowler knocked down all the pins with two balls thrown so as to make a spare, consisting of eight pins on the first ball and two pins on the second ball; and on the first ball of the second frame knocks down seven pins, followed by knocking down two more pins on the second throw for a total of nine pins in the second frame. Under conventional manual scoring and mechanical scoring devices of the prior art, no score for the first frame would be entered until after the first ball is thrown in the second frame knocking down the seven pins. Then a score of 17 is entered into the box representing the first frame on the score sheet, and after the second ball is thrown a score of 26 is entered into the box representing the second frame on the score sheet (this representing the total of the nine pins knocked down in the second frame added to the 17 from the first frame).

The totalizer of this invention would indicate a total score of 8 after the first ball of the first frame, followed by an indicated score of 10 after the second ball of the first frame is thrown. With the appropriate relay activated, the seven pins knocked down by the first ball of the second frame would be counted twice to show a total score of 24, which would be followed by an indicated total score of 26 after the second ball of the second frame is thrown knocking two additional pins down.

Figure 4:
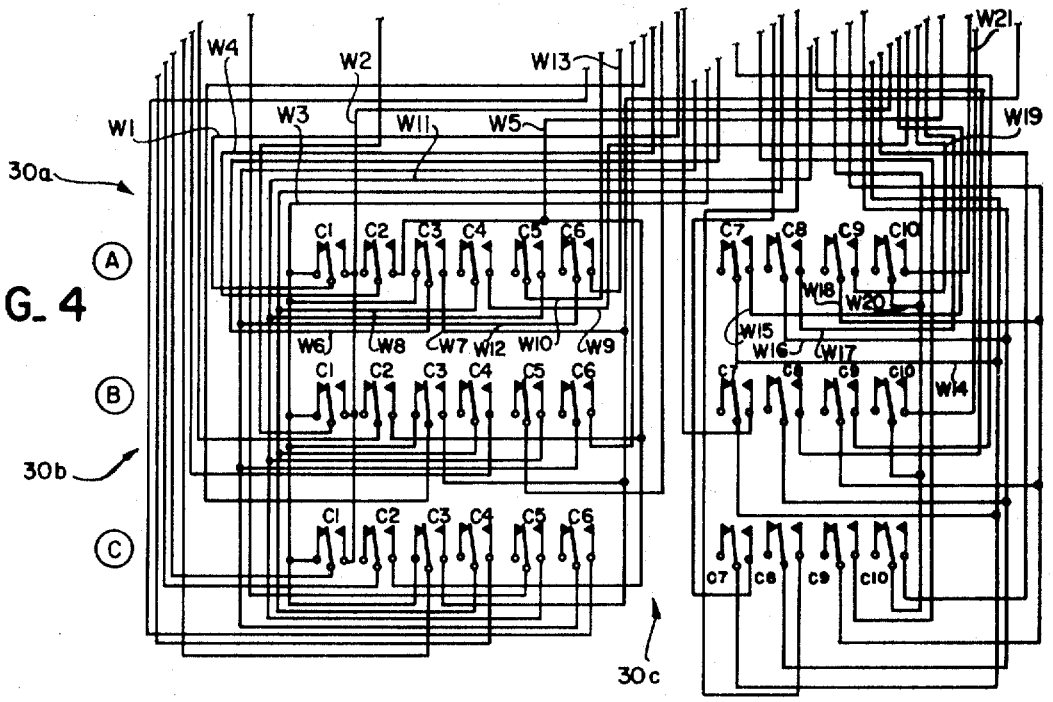

An actual comparison of a complete tenpin game using the conventional manual scoring system and mechanical systems of the prior art as against what the totalizer of this invention would show after each ball is thrown is as follows (the dashes shown in the Pins Down and Totalizer lines indicating a skipped ball or ball that is not thrown):

Referring now more particularly to the drawings, FIGURE 1 has previously been identified as being one diagrammatic switching arrangement on automatic pinsetting equipment adapted for this invention, and it is the purpose of this switching arrangement to provide electrical signals through any number of the thirteen electrical circuit connections between the automatic pinsetting equipment and the automatic score computer of this invention as will be described in more detail hereinafter. FIGURES 2, 3 and 4 each depict a portion of the computer elements and circuitry, and are interrelated in such a manner that the circuit paths coming into the top of FIGURE 2 are those connected to the automatic pinsetting equipment depicted in FIGURE 1, while the circuit paths ending at the bottom of FIGURE 2 correspond identically to those starting at the top of FIGURE 3. Similarly, the circuit paths ending at the bottom of FIGURE 3 correspond identically with those starting at the top of FIGURE 4, it further being noted that there are no unconnected or open circuit paths extending out of the bottom or sides of FIGURE 4. FIGURE 5 is similar to a part of the showing of FIGURE 2 in that it depicts another embodiment showing only the bonus relays of one individual player, the multiplication relays and the wiring interconnecting FIGURE 5 to the circuit paths ending at the top of FIGURE 3, while FIGURE 6 shows the arrangement of certain modified portions of FIGURES 2 and 5 with the multiplication relays replaced by a thirty-position timing stepper.

Before getting into too many precise details of the equipment interconnection or wiring, a summary of the equipment or devices utilized is believed appropriate. The equipment pertinent to this invention and associated with the automatic pinsetting equipment is shown in FIGURE 1, and consists of a pin positioning microswitch for each of the ten pin positions located in the automatic pinsetting rack. Along with the pin microswitches are a plurality of additional switches with specific functions, all of which will be described in more detail hereinafter.

As for the computer elements shown in FIGURES 2, 3 and 4, there is included a thirty-position rotary stepping switch 25, a ten-position rotary stepping switch 26, and a rotary camming switch operator 27, all interconnected by a mechanical drive 28 so that switches 25 and 26 may be driven concurrently with a switch operator 27 by a stepper drive 29 supplied electrical power by and partially controlled by the operation of the pinsetting rack.

There is a player selector switch 30 for each individual bowler, each selector switch 30 having ten contacts whose function and purpose will be explained in more detail later. Since the diagrammatic showing of the computer of this invention has been described as only showing the arrangement for three bowlers at a time, it is of course to be understood that the preferred number of items to be incorporated into each actual computer unit is five or six, which then provides sufficient computer capacity for league and tournament type bowling, as well as about the maximum capacity that can readily be handled for regular open bowling; that is, other than league or tournament bowling. Since the player selector switches 30 will have a button or other appropriate actuating mechanism (not shown) and it would be logical to have them identified by letters, such as A, B, C, etc., through F, the three player selector switches shown in the drawings are identified as 30A, 30B and 30C. It is also to be understood that insofar as league and tournament bowling is con-

| Frame | 1 | | 2 | | 3 | | 4 | | 5 | | 6 | | 7 | | 8 | | 9 | | 10 | | TOTAL |
|---|---|---|---|---|---|---|---|---|---|---|---|---|---|---|---|---|---|---|---|---|---|
| Ball | 1 | 2 | 1 | 2 | 1 | 2 | 1 | 2 | 1 | 2 | 1 | 2 | 1 | 2 | 1 | 2 | 1 | 2 | 1 | 2 | 3 |
| Pins Down | 8 | 2 | 9 | 0 | 10 | — | 10 | — | 10 | — | 6 | 4 | 7 | 3 | 8 | 1 | 10 | — | 10 | 8 | 2 |
| Manual | 19 | | 28 | | 58 | | 84 | | 104 | | 121 | | 139 | | 148 | | 176 | | 196 | | 196 |
| Totalizer | 8 | 10 | 28 | — | 38 | — | 38 | — | 88 | — | 106 | 114 | 128 | 131 | 147 | 148 | 158 | — | 178 | 194 | 196 |

cerned each bowler will alternate his frames bowled from an alley on the right to an alley on the left and so forth, while bowlers from the other group or team will alternate their bowling on alleys in an opposite direction; that is, they will start on the alley on the left for example, then switch to the alley on the right, then back to the alley on the left and so forth. When using a pair of the computers of this invention on a pair of adjacent alleys, any appropriate type of switching means such as shown in Millman et al., identified above, may be used to activate the first player selector switch in one computer side or bank after the last player selector switch in the other computer has completed its operation.

For each player position having a player selector switch 30 there is provided in the first described embodiment of this invention a next-to-last-ball-strike relay 31, a last-ball-strike relay 32, a spare or last-ball-spare relay 33, an individual totalizer 34, a frame counter 35, a ball-cam 36 that is interconnected to the frame counter 35 and driven thereby, and an end-to-game mode relay 37. As stated, there is a complete set of all the immediately heretofore listed items and devices for each player selector switch 30 contained in one embodiment of the computer of this invention, and accordingly, all items or devices are identified by the small letters a, b, and c, corresponding to the letters A, B, and C in the associated and relative player selector switch 30.

Next, there is provided a relay 38 and a relay 39, both of which are operable with any of the player selector switches 30, depending upon which player selector switch is closed during the counting cycle, the function and purpose of relays 38 and 39 being explained in detail hereinafter. Lastly, there is provided a counter 40 which serves to indicate the recorded pinfall on the last ball thrown, and a clearing switch 42, both of which will be explained later.

Referring back to FIGURE 1, there is presented diagrammatically the circuitry of ten microswitches 1a through 10a located within a pin rack 11 in a representative manner so that microswitch 1c is in the position pin number one would occupy in the pin rack or in the position of a full set of standing bowling pins. Likewise for the microswitches 2a through 10a, and all of which are of the double pole, double throw (DPDT) type. Each of the microswitches 1a through 10a is arranged and controlled so as to pass an electrical signal received through switches S3 and S4 from an indicated source (not shown) through contact 12 on to an associated relay R1 through R10 respectively; the microswitch 1a passing a signal to relay R1, microswitch 2a passing a signal to relay R2, microswitch 3a passing a signal to relay R3, etc., on to microswitch 10a passing a signal on to relay R10. While only relays R1 and R7 are shown for simplicity, it is to be understood that there is a relay for each of the other microswitches 2a–6a and 8a–10a identical to the relays R1 and R7 as shown. The signals passing through relays R1 through R10 go to the respective terminals 1 through 10 for further passage into the computer as a signal of the pin of a corresponding number being knocked down, the handling of such signals by the computer being further explained in detail hereinafter.

Switch S1 is generally of a mercury type that is already incorporated in automatic bowling pin setting equipment concerned with in this invention, switch S1 closing when the pin rack reaches the over-travel point in its downward travel that indicates there are no pins left standing. When this happens in the first throw of a frame, switch S2 will be in the position shown in solid line in FIGURE 1 so that closure of switch S1 will transmit an electrical signal to the computer through the conductor path labeled "Strike." Switch S2 is arranged such that when the pin rack travels down for the second ball thrown in a frame, switch S2 will be in the position indicated by dotted line in FIGURE 1 so that as switch S1 closes from the over-travel of the pin rack an electrical signal will pass to the computer through the conductor path labeled "Spare."

Figure 1:
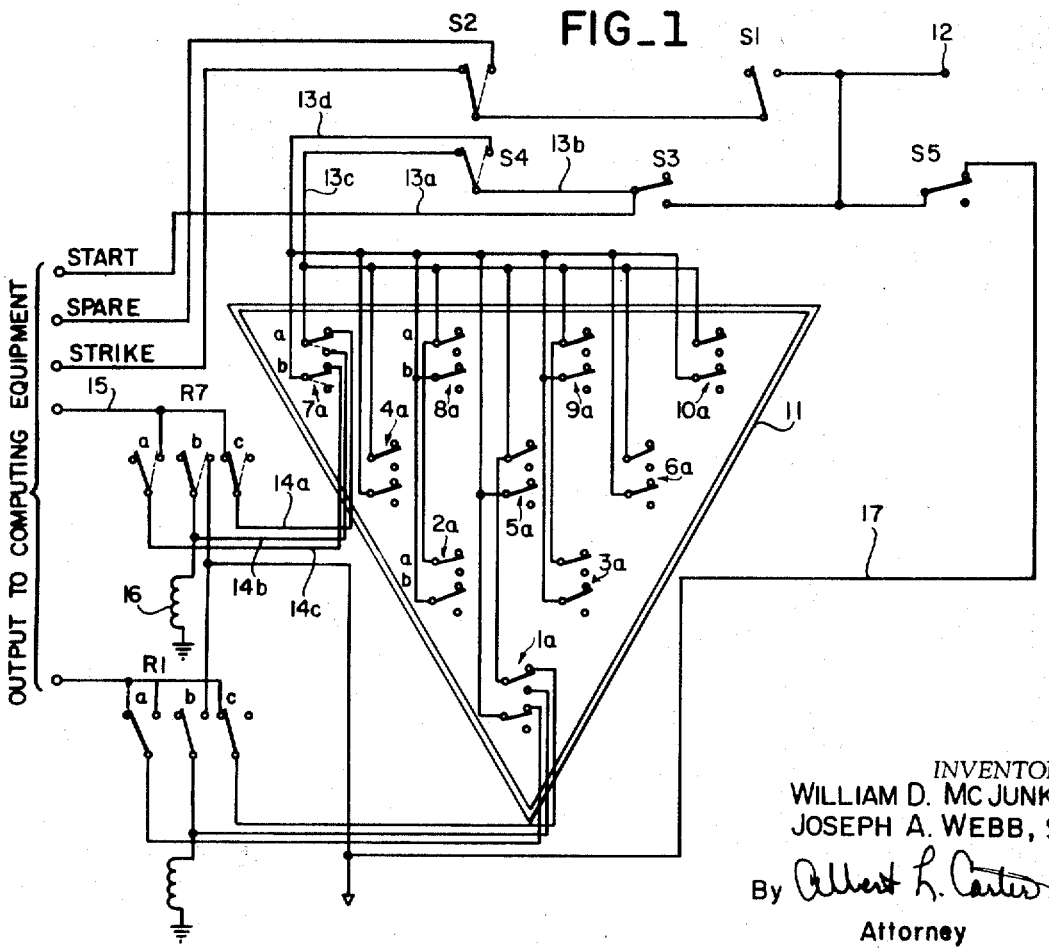
FIGURE 1 is a diagrammatic showing of one switching arrangement on the rack member of an automatic bowling pin setting equipment adapted to this invention.

Operation of the structure described so far in FIGURE 1 occurs by the closure of switch S1 on the first ball or on the second ball thrown as explained heretofore for the passage of a "strike" or "spare" signal. As the rack 11 comes down, switch S3 is closed by action of the rack 11 completing the electrical circuit from contact 12 to each of the microswitches 1a through 10a, this circuit passing through switch S4 on the first ball thrown through the contact arm shown in FIGURE 1 by the solid line and on the second ball thrown through the contact arm of switch S4 shown in dotted line. It is to be understood that the electrical circuit goes to all microswitches 1a through 10a and all relays R1 through R10, all of which operate exactly as microswitch 7a and relay R7 whose operation will be the only one described.

After the rack 11 completes its downward travel to what can be called its sensing position, switch S3 will close permitting passage of electrical energy or current over wires or lines 13a and 13b, it of course being understood that should any pins remain standing after the first ball thrown, switch S1 will not be closed. The signal passing through line 13a is the start sequence signal that goes to the stepper drive 29 (FIGURE 2), the function of which will be explained in more detail later. The signal passing through S3 over line 13b will pass through switch S4 to line 13c after the first ball of a frame is thrown and to line 13d after the second ball of a frame is thrown; the signals over line 13e going to contacts a of each of the DPDT microswitches 1a through 10a, while the signals over line 13d going to the b contacts of the microswitches 1a through 10a. In the case of microswitch 7a, if the seven pin were knocked down by the first ball, the contacts of switch 7a remain as they are shown in solid line. Thus, the signal passes over line 14a to contact c of relay R7 and over line 15 to terminal 7 for passage into the rest of the equipment to indicate pin seven has been knocked down, as will be explained in more detail later. If the seven pin is not knocked down on the first ball, then the contacts of microswitch 7a will be placed in the position indicated by the dotted lines through the action of the seven pin meeting with the rack 11. In this instance the signal will pass over line 14b to activate a solenoid, relay coil, or other appropriate device 16 causing the contact arms of relay R7 to move from the solid line positions to the dotted line positions, coil 16 being locked into position by electrical energy from contact 12 through switch S5, line 17 and contact b of relay R7. Since the contact arm of switch S4 is in the solid line position, there is no passage of any electrical energy over line 14c on the sequencing after the first ball.

After the rack 11 raises for the second ball of the frame to be thrown, the contact arm of microswitch 7a returns to the solid line positions and switch S3 opens while the contact arm of switch S4 moves to its dotted line positions; switch S5 remaining closed to keep coil 16 of relay 7 activated to hold the contact arms of relay R7 in their dotted line positions. As the rack 11 moves downward after the second ball is thrown, the contact arms of switches S2 and S4 both move to their dotted line positions. Thus, if all the remaining pins from the first ball are knocked down, then switch S1 closes causing a signal indicating a "spare" has been made to enter the computer. If on the second sensing action of the rack 11 the seven pin is not standing, the contact arm b of microswitch 7a retains its solid line position and the electrical energy passes to contact a of relay R7 and on to terminal 7 over line 15. Such a signal can reach terminal 7 after the second ball only if the seven pin remained standing after the first ball, for if it were knocked down by the first ball, coil 16 would not be activated and contact arm a of relay R7 would remain in its solid line position. Likewise, if the seven pin remains standing after the second ball, the contact arms a and b of microswitch 7a would be moved to their dotted line positions and no signal would pass to relay R7 whatsoever.

Upon completion of the sampling and sequencing after the second ball, switch S3 opens, switches S2 and S4 return to their solid line positions, and switch S5 opens momentarily to give a breaking action to deactivate all the relay coils 16 and let the contact arms of all the relays R1 through R10 return to their solid line positions. Thus, it may be seen that there is provided an appropriate signal over each of the terminals 1 through 10 whenever that respective pin is knocked down, whether it be on the first or second ball thrown in a frame. Additionally, there is also provided an appropriate signal after each ball is thrown for the computer to start its sequencing operation, as well as a signal whenever a "strike" or "spare" has been made.

While not shown in the drawings for purposes of clarity, the terminals 1 through 10 are each connected respectively to the terminals 1 through 10 on the thirty-position rotary stepping switch 25, the ten-position rotary stepping switch 26, relay 38 and relay 39; thusly, passing the signal achieved by a pin being knocked down in the heretofore described arrangement to each of the four respective terminals, the purpose of which will be explained in more detail hereinafter.

Each of the player selector switches 30a, 30b and 30c have ten contacts c1 through c10, and each of the contacts has an activated and deactivated position; the activated and deactivated positions determined by whether the button for that player selector switch is depressed or not and whether it be by manual or automatic means. Once one of the player selector switches is depressed, that player selector switch is arranged so that all the contacts c1 through c10 for that switch are placed in their activated positions and all the contacts of all other player selector switches are placed or remain in their deactivated position, or in other words, only one player selector switch can have its contacts c1 through c10 in the activated position at one time. The position of the contacts c1 through c10 of all the player selector switches 30a, 30b and 30c as seen in FIGURE 4 is that they are all deactivated. Likewise, while such is not shown in the drawings, in addition to the ability to manually activate any player selector switch 30a, 30b or 30c, an automatic stepping arrangement or mechanism can be utilized for automatically activating the following or next appropriate player selector switch such as shown in the Millman et al. patent cited above.

The precise details of connections of the contacts c1 through c10 of the player selector switch 30a will now be set forth, it further being understood that such connections are identical for the other player selector switches 30b and 30c that are shown as well as the connections would be the same for all the player selector switches incorporated into the computer regardless of the actual or total number.

Referring specifically to the player selector switch 30a, as seen in FIGURE 4, each of the contacts c1 through c10 consists of a movable contact arm and an activated and deactivated stationary contact, and as previously noted, all the movable contact arms are shown in contact with the stationary deactivated contacts. The connections of the contacts c1 through c10 of player selector switch 30a will now be specifically set forth with the function and operation of such connections described in detail hereinafter along with the connections of the rest of the equipment of the computer of this invention in the operational description thereof The movable arm of contact c1 is connected by line or wire w1 to the stationary activated member of contact a in last-ball-strike relay 32a, while the stationary activated member of contact c1 is connected by wire w2 to contact SC5 in the rotary camming switch operator 27. The stationary deactivated member of contact c1 receives electrical energy from power input terminal 42 (FIGURE 2) through wire w3 and the upper stationary member of contact a in clearing switch 41 (FIGURE 2); this electrical energy input through wire w3 going to the stationary deactivated member in contact c1 of each player selector switch 30a, 30b, 30c, etc., as well as to the stationary deactivated members of contacts c3 in each player selector switch (FIGURE 4), to the stationary activated members a of each of the end-of-game relays 37 (37a, 37b, 37c, etc., FIGURES 2 and 3), to contacts SC1, SC2, SC3, SC4, SC5 and SC9 or rotary camming switch 27 (FIGURE 3), to the movable arm of contact b in each last-ball-spare relay 33, to the movable arm of contact d in each last-ball-strike relay 32, to the movable arm of contact c in each next-to-last-ball-strike relay 31, and to the stationary activated member of contact b each next-to-last-ball-strike relay 31.

The movable arm of the player selector switch contact c2 is connected by wire w4 to the stationary activated member of contact b in the last-ball strike relay 32a. The stationary deactivated member of contact c2 is unconnected so as to cause an open circuit, while the stationary activated member of contact c2 is connected through a wire w5 to contact SC4 of rotary camming switch operator 27.

The stationary deactivated member of contact c3 is connected to the stationary deactivated member of contact c1 and the other connections as set forth above through wires w3, while the movable arm of contact c3 is connected through wire w6 to stationary activated member of contact a of last-ball-spare relay 33a and stationary activated member of contact a of the next-to-last-ball-strike relay 31a. The stationary activated member of contact c3 is connected through wire w7 to contact SC3 of camming switch operator 27.

The movable arm of contact c4 is connected through wire w8 to the activating solenoid of relay 39 (FIGURE 2), while the stationary deactivated member of contact c4 is not connected and open circuited, and stationary activated member of contact c4 is connected by wire w9 to the movable arm of contact c in the last-ball-strike relay 32a.

The stationary deactivated member of contact c5 is not connected so as to cause an open circuit when contacted by the movable arm of contact c5, which is connected by wire w10 to stationary activated member of contact b in the last-ball-strike relay 33a, the stationary activated member of contact d in the last-ball-strike relay 32a, and the stationary activated member of contact c in the next-to-last-ball-strike relay 31a. The stationary activated member of contact c5 is connected through wire w11 to the activating solenoid of relay 38.

The movable arm of contact c6 is connected by wire w12 to the rotating arm of the thirty-position rotary stepping switch 25, while the stationary activated member of contact c6 is connected by wire w13 to the totalizer 34a.

The movable arm of contact c7 is connected through wire w14 to SC6 of camming switch operator 27, while stationary activated member of contact c7 is connected by wire w15 to contacts c and d of ball-cam 36a.

The movable arm of contact c8 is connected through wire w16 to SC7 of camming switch operator 27, while stationary activated member of contact c8 is connected by wire w17 to contact b and c of ball-cam 36a.

The movable arm of contact c9 is connected through wire w18 to SC8 of camming switch operator 27, and the stationary activated member of contact c9 is connected by wire w17 to contacts b and e of ball-cam 36a.

The movable arm of contact c10 is connected by wire w20 to SC9 of camming switch operator 27, while the stationary activated member of contact c10 is connected by wire w21 to the frame counter 35a, contact f of ball-cam 36a, the stationary deactivated member of contact b of the end-of-game-mode relay 37a, and to contact a of ball-cam 36a through a delay relay or device 36d.

It is to be noted that the stationary deactivated members of contacts c6, c7, c8, c9, and c10 are not connected to anything so as to cause an open circuit when they are contacted by the movable arms of those contacts.

It is to be further noted here that the foregoing explanation of connections of the contacts c1 through c10 of the player selector switches has been specifically described for the player selector switch 30a, and it is to be understood that similar connection arrangements are to be provided for each player selector switch in the computer; some of the connections being independent for each player selector switch, while other connections are such that all player selector switches are connected in parallel as can be seen in the drawings.

A detailed step-by-step operation in scoring of the exemplified game set forth above will now be made with the description of wired connections not explained heretofore added as they are utilized in the scoring operations.

As the first ball of the first frame is thrown with the player selector switch 30a in its activated position, the rack 11 will move down to its sensing position with switch S3 closing to pass electrical energy from the source through contact 12 to wires 13a and 13b, and since this is the first ball of a frame, switch S4 will remain in the position shown in solid lines to pass the electrical energy to microswitches 1a through 10a by wire 13c. Since only eight pins are knocked down on the first ball, switch S1 remains open so as to prevent any signal passing through either the "spare" or "strike" signal lines to the computer, and there will be eight *of* [or] the ten terminals 1 through 10 energized, which in turn results in eight of the ten terminals 1 through 10 being energized in the thirty-position rotary stepping switch 25, the ten-position rotary stepping switch 26, relay 38 and relay 39. With the closure of switch S3 as rack 11 moves down to its sensing position, electrical energy is passed to the stepper drive 29 over wire 13a, which begins rotation of the sweeper arms on the rotary stepping switches 25 and 26, and the rotary camming switch operator 27, which are all interconnected by mechanical drive 28. As camming switch 27 begins to rotate, contact SC1 thereon closes, which in turn maintains the electrical circuit from power input terminal 42 to stepper drive 29 through closed contact a of clearing switch 41, wire w3, contact SC1 of camming switch 27, and wire w22. In addition to supplying electrical energy to contact SC1 of camming switch 27, the electrical energy from power input terminal 42 goes through contact a of clearing switch 41 over wire w3 to all the various contacts wire w3 is connected to as set forth above. Note that in the case of player selector switch 30a being in the activated position as this is the player scoring mechanism we are concerned with using in the game being described, the electrical energy passing through the movable arm of contact c1 of player selector switch 30a comes through contact SC5 of camming switch 27 by way of wire w2, and onto the stationary activated member of contact a of the last-ball-strike relay 32a. Since this is the first ball thrown in the first frame of a new game, the last-ball-strike relay 32a could not be in an activated position, and so the electrical circuit through contact c1 of the player selector switch 30a is open. This same situation exists for the electrical circuit through contact c3 of the player selector switch 30a coming from contact SC3 of camming switch 27 by way of wire w7, to contact c3, and then to the last-ball-spare and next-to-last-ball-strike relays 33a and 31a respectively over wire w6.

The activation of contact c4 of player selector switch 30a will not activate relay 39 due to the open circuit caused by the last-ball-strike relay 32a being in its deactivated position (which is normal since this is the first ball of a game thrown or being counted). Likewise, the activation of contact c5 of player selector switch 30a will not activate relay 38 due to the open circuit caused by the next-to-last-ball-strike relay 31a, last-ball-strike relay 32a, and last-ball-spare relay 33a all being in their deactivated positions.

Contact c6 of player selector switch 30a will pass the electrical energy signal pulses from the thirty-position rotary stepping switch 25 to the totalizer 34a as the arm of switch 25 completes one rotation sweeping over all the contacts thereon indicated as 1 through 30. Since eight of these contacts will be energized from the terminals coming from pin rack 11, there will be a total of eight individual electrical signals or pulses passed to totalizer 34a to indicate a pin count of eight; the path of each electrical signal or pulse being from rotary switch 25, wire w12, contact c6 of player selector switch 30a, wire w13 to the totalizer 34a.

Contact c7 of player selector switch 30a serves to pass the electrical signal indicating a spare to activate the solenoid of the last-ball-spare relay 33a, the signal going from terminal 12, through switches S1 and S2 (through switch S2 when the rack 11 comes down for the second ball and hence the switch is in its dotted position as shown in FIGURE 1), then to the Spare terminal, wire w23 to contact SC6 of camming switch operator 27, wire w14 to contact c7 of player selector switch 30a, then through wire w15 to contacts d and c of ball-cam 36a, and then from contact d over wire w24 to the solenoid of last-ball-spare relay 33a. On the first ball as we are now considering, this is an open circuit due to the position of switches S1 and S2 of the pin rack 11.

Contact c8 of player selector switch 30a serves to connect the strike signal to the solenoid of the last-ball-strike relay 32a; the strike signal passing from the strike terminal on pin rack 11 to contact SC7 on switch operator 27 through wire w25, then from contact SC7 to contact c8 of player selector switch 30a over wire w16, then over wire w17 to contacts b and e of ball-cam 36a, then from contact e of ball-cam 36a to the solenoid of the last-ball-strike relay 32a over wire w26. Since switch S1 on pin rack 11 is open as there is no strike from the ball we are now considering, there is no electrical signal being delivered to contact SC7 of switch operator 27.

With contacts SC7 and SC8 of switch operator 27 connected electrically, any strike signal would also be passed to contact c9 of player selector switch 30a through wire w18 from SC8 to contact c9, and from there to contact f of ball-cam 36a over wire w19. This in turn would return a strike signal back to contact c10 of player selector switch 30a over wire w21, while at the same time pass a strike signal on to contact a of ball-cam 36a (and which is open) through wire w27, contact b of the end-of-game relay 37a, and wire w28, as well as pass the strike signal to open contact a of ball-cam 36a from wire w21 through delay relay 36d.

Contact c10 of player selector switch 30a passes electrical energy that comes through contact SC9 of switch operator 27 from wire w3, and into contact c10 through wire w20, to the frame counter 35a over wire w21, to advance the frame counter 35a to indicate the ball that has been thrown and is being scored.

As stated above, as stepper drive 29 receives a start signal from the pin rack 11 over wire 13a, stepping switch 27 will start rotating and close contact SC1, which in turn will supply electrical energy from wire w3, to stepper drive 29 over wire w22 until contact SC1 is opened at the end of one full rotation of stepping switch 27. Next, the momentary closing of contact SC2 will pass electrical energy to the scored-last-ball counter 40 over wire w29; this clearing signal resetting the counter 40 of the scored-last-ball count received from the rotating arm of the ten-position stepping switch 26 over wire w30 (it further being noted here that with eight pins being knocked down on this first ball of the first frame, only eight of the ten terminals on switch 26 will be energized).

The next operation of switch operator 27 is to make a momentary break of contact SC3 to interrupt any elecrical energy serving to keep the solenoids activated of he last-ball-spare relay 33a and the next-to-the-last-ball-trike relay 31a, whereby when either or both of these elays are in their activated positions, they will thusly e returned to a deactivated position.

Next, the closing of contact SC4 sends electrical energy o contact c2 of player selector switch 30a over wire w5, nd from contact c2 over wire w4 to contact b of last-all-strike relay 32a, and with this contact open this cir-uit is then open.

The continuation of operation of camming switch 27 s to interrupt the supply of electrical energy to contact 1 of player selector switch 30a over wire w2 by the open-ng of contact SC5 of camming switch operator 27, this ircuit opening result causing the release of the activating olenoid of the last-ball-strike relay 32a if it were closed. However, since relay 32a is open in this case, the opening f contact SC5 of camming switch operator 27 has no ffect this time.

With no signal coming in on wire w23 from the spare erminal on the pin rack 11, the closure of contact SC6 n camming switch operator 27 will have no effect at his time. Likewise, with no signal coming in on wire w25 rom the strike terminal on pin rack 11, the closure of ontacts SC7 and SC8 of camming switch operator 27 vill have no effect at this time.

The closure of contact SC9 on camming switch oper-tor 27 sends an electrical pulse signal to frame counter 35a via wire w20, contact c10 of player selector switch 30a, and wire w21, this electrical pulse to frame counter 35a serving to register the first ball of the first frame as vell as to advance ball-cam 36a through the mechanical nterconnection of ball-cam 36a and frame counter 35. In addition, this electrical energy is passed on to contact of ball-cam 36a directly from wire w21 through delay elay 36d in addition to contact a of ball-cam 36a via vire w27, contact b of end-of-game relay 37a, and wire v28, which in turn serves no function at this time since ontact a of ball-cam 36a is open. This electrical energy ulse to frame counter 35a also passes over the wire w27 o contact f of ball-cam 36a, and from there over wire v19 to contact c9 of player selector switch 30a, which n turn is connected to open contact SC 8 of camming witch operator 27; this double connection of the frame ounter 35a to an electrical energy source serving to ac-omplish a two ball thrown indication in the case of a trike, as will be more clearly seen hereinafter.

As the camming switch operator 27 rotates around to vhere contact SC1 breaks, the electrical power to the tepper drive 29 is interrupted, and the computer equip-nent of this invention is ready to start the sequencing peration for the next ball to be thrown, or in other vords, the second ball of the first frame, with the score on he totalized 34a reading "8" as does the score reading on he scored-last-ball counter 40.

On the second ball, the two standing pins are knocked lown so as to cause electrical energy to pass to two of he ten terminals indicating down pins, as well as an lectrical signal to appear on the spare indicating ter-ninal due to the closing action of switch S1 on pin rack 11 from the over-travel thereof as set forth above. As ccurs after every ball is thrown and pin rack 11 starts ts downward travel, the closure switch S3 on pin rack 11 causes a start signal to pass to stepper drive 29 which tarts rotating the sweeper arms of the rotary stepping witches 25 and 26, along with the rotation of camming witch operator 27. The closure of contact SC1 causes he continuous flow of electrical energy to stepper drive 29 until SC1 is opened upon the complete rotation of amming switch operator 27. Next, the closure of contact SC2 clears the scored-last-ball counter 40. As the cam-ming switch operator travels from contact SC2 to SC3, two electrical pulses are transmitted from rotary stepping witch 25 to the totalizer 34a, while two electrical pulses are transmitted from rotary stepping switch 26 to the scored-last-ball counter 40.

The opening of contact SC3 of camming switch operator 27 has no effect at this time since the activating solenoids of last-ball-spare relay 33a and the next-to-last-ball-strike relay 31a are not energized. Likewise, the closure of contact SC4 of camming switch operator 27 has no effect at this time as contact b of the last-ball-strike relay 32a is in its unactivated position. There is also no effect at this time of the opening of contact SC5 of camming switch operator 27 as contact a of the last-ball-strike relay 32a is in its unactivated position.

Closure of contact SC6 of camming switch operator 27 results in the electrical energy signal indicating a spare from the pin rack 11 over wire w23 to pass to the sole-noid of last-ball-spare relay 33a, thereby activating the relay. Once placed in its activated position the last-ball-spare relay 33d is retained there by electrical energy sup-plied to the solenoid through the path of closed contract SC3 of camming switch operator 27, wire w7, contact c3 of player selector switch 30a, wire w6, and contact a of the last-ball-spare relay 33a. The movable arm of contact b in the last-ball-spare relay 33a is connected through the wire w3 network to the electrical energy input terminal 42, this electrical energy passing through contact b of the last-ball-spare relay 33a going to the solenoid of relay 38 via the path of the activated stationary member of con-tact b of the last-ball-spare relay 33a, wire w10, contact c5 of player selector switch 30a, and wire w11 directly to the activating solenoid of relay 38.

There is no resulting effect by the closure of contacts SC7 and SC8 on this ball since the circuits involved re-main open due to the lack of an electrical signal indicat-ing a strike on wire w25.

As contact SC9 of camming switch operator 27 is closed, an electrical energy pulse is transmitted to the frame counted 35a via the route of contact SC9, wire w20, contact c10 of player selector switch 30a, wire w21 to frame counter 35a; the advancement of frame counter 35a also providing the appropriate advancement of ball-cam 36a. With contact a of ball-cam 36a open there is no passage of the electrical energy pulse through delay relay 36d or contact b of end-of-game relay 37a. Thus, when the camming switch operator 27 stops when contact SC1 is opened, the status of the computer at the end of the first frame has the solenoids energized on last-ball-spare relay 33a and the relay 38 whereby both of these relays are in their activated positions, the scored-last-ball counter 40 indicates a "2," and the totalizer 34a indi-cates a "10."

Going on to the second frame in our exemplified game, there are nine pins knocked down on the first ball result-ing in electrical energy passing from pin rack 11 to the computer through the start signal line and only nine of the ten pin terminals. This results in nine of the termi-nals on both the thirty-position rotary stepping switch 25 and the ten-position rotary stepping switch 26 being ener-gized directly from the pin rack 11. However, there are an additional nine contacts on the thirty-position rotary stepping switch 25 energized since relay 38 is in its acti-vated position as explained hereinabove due to the knock-ing down of all ten pins in the two throws of the first frame for a spare, which provides a bonus count for the spare of ten pins for the pins knocked down in the spare frame plus the number of pins knocked down on the next ball (which in this case is a bonus of nine). This bonus count is fed into the totalizer 34a by energizing an extra or additional nine terminals in the thirty-position rotary stepping switch 25, so that as the sweeping contact of switch 25 rotates, there will be a resulting eighteen sig-nal pulses to the totalizer 34a. The energizing of the extra terminals on switch 25 is accomplished by the ener-gized or activated relay 38 in that for every terminal 1 through 10 in relay 38 that carries electrical energy from the pin rack 11, the corresponding terminals 11 through 20 in relay 38 will transmit the electrical energy on to the appropriate terminals 11 through 20 on the thirty-position rotary stepping switch 25 over wires interconnecting these terminals, the wires not being shown in the drawings for purposes of clarity. The addition of eighteen pins to the score shown on totalizer 34a accounts for the nine pins added as a bonus for the spare of the previous frame plus the nine pins added as the score increase resulting from the pins knocked down on the first ball of this frame.

As camming switch operator 27 rotates the closure of contacts SC1 and SC2 thereon supplies electrical power to stepper drive 29 and clears the scored-last-ball counter 40 respectively. As the camming switch operator 27 revolves from contact SC2 to SC3, the rotary stepping switches 25 and 26 operate to add the count of eighteen pins to totalizer 34a and nine pins to the scored-last-ball counter 40 respectively.

The opening of contact SC3 of camming switch operator 27 serves to interrupt the energizing electrical power to the solenoid of last-ball-spare relay 33a, putting the relay 33a into its deactivated position, and this change of the position of relay 33a in turn interrupting or opening the circuit supplying the electrical energy to the solenoid of relay 38; it further being noted here that the purpose for activating relay 38 having been served since the additional pin count or score count from rotary stepping switch 25 occurred prior to the opening of contact SC3 of camming switch operator 27.

The closing of contacts SC4, SC6, SC7 and SC8, along with the opening of contact SC5, all of camming switch operator 27, has no effect on this ball due to either the lack of appropriate electrical signals or open circuits.

The closing of contact SC9 on camming switch operator 27 serves to advance the frame counter 35a and a corresponding advancement of the ball-cam 36a, after which the camming switch operator stops rotating upon the opening of its contact SC1. At this time the status of the computer is that all relays are in their deactivated positions except for the player selector switch 30a, a score of "28" is indicated on the totalizer 34a, and a score of "9" is indicated on the scored-last-ball counter 40.

The only actions caused by the rotation of the camming switch operator 27 after the second ball of the second frame is thrown with which the one standing pin is not knocked down are to clear the scored-last-ball counter through contact SC2 and to advance the frame counter 35a and ball cam 36a through contact SC9. At this point the status of the computer is that all relays are in their inactivated positions, player selector switch 30a is activated, the totalizer 34a indicates a score of "28," and there is a "0" indicated on the scored-last-ball counter 40.

With all ten pins knocked down on the first ball thrown in the third frame, there results from the down travel of pin rack 11 an electrical signal on all ten pin indicating circuits from pin rack 11, plus the start signal to stepper drive 29 over wire 13a, and an electrical signal indicating a strike over wire w25 due to the closing of switch S1 on pin rack 11. After the closure of contacts SC1 and SC2 of camming switch operator 27, a count of ten pins is added to the totalizer 34a through the rotary stepping switch 25, while a count of ten pins is added to the scored-last-ball counter 40 through the rotary stepping switch 26. Rotation of camming switch operator 27 through contacts SC3, SC4, SC5 and SC6 causes no effect on the computer, while the closure of contact SC7 results in energizing of the solenoid of last-ball-strike relay 32a via the path of wire w16, contact c8 of player selector switch 30a, wire w17, contact e of ball-cam 36a, and wire w26. The supply of electric power to the solenoid of relay 32a to keep it in its activated position is maintained after the opening of contact SC7 of camming switch operator 27 through the circuit route of power input terminal 42, contact a of clearing switch 41, wire w3, contact SC5 of camming switch operator 27, wire w2, contact c1 of player selector switch 30a, wire w1, and contact a of the last-ball-strike relay 32a, which in turn is connected to wire w26 and on into the solenoid. At this time the circuitry containing contacts b and c of last-ball-strike relay 32a is open as can be seen by a tracing of the circuits, and the function of these contacts will become more apparent as they are explained in detail hereinafter. With the last-ball-strike relay 32a activated, contact d serves to pass electrical power to the solenoid of relay 38 for the activation thereof through the circuit route of power input terminal 42, contact a of clearing switch 41, wire w3, contact d of last-ball-strike relay 32d, wire w10, contact c5 of player selector switch 30a and wire w11.

Next in line are the closures of contacts SC8 and SC9 of camming switch operator 27, the closure of both of these contacts serving to supply a signal to frame counter 35a and a corresponding advancement of ball-cam 36a. Since each frame consists of the throwing of two balls unless all the pins are knocked down on the first ball for a strike, in the case of a strike an additional signal will have to be supplied to the frame counter to bypass or eliminate the second ball throwing in a frame due to the strike as well as advance the ball-cam 36a, and this is exactly what occurs through the closing action of contact SC8 when a strike is thrown, for the closure of contact SC9 will advance both the frame counter 35a and the ball-cam 36a upon the scoring of every ball thrown regardless of whether it is a strike or not.

Thus, at the end of the third frame the status of the computer is that the last-ball-strike relay 32a and relay 38 are activated, the scored-last-ball counter 40 indicates "10," and there is a score of "38" indicated on totalizer 34a.

With the strike in the fourth frame, the operation of the computer up through contact SC3 of camming switch operator 27 is the same as for the third frame with the exception that a pin count of twenty is added to totalizer 34a due to the activated status of relay 38 and the energizing of contacts 1 through 20 on the thirty-position rotary stepping switch 25. Upon the closure of contact SC4 of camming switch operator 27, electrical energy is supplied to the solenoid of the next-to-last-ball-strike relay 31a, the circuit from contact SC4 via wire w5, contact c2 of player selector switch 30a, wire w4, contact b of last-ball-strike relay 32a, and wire w31 to the solenoid of the next-to-last-ball-strike relay 31a. Once the next-to-last-ball-strike relay 31a is activated by the closure of contact SC4 of camming switch operator 27, continuation of the supply of electrical power to the solenoid of relay 31a is accomplished through the circuitry of power input terminal 42, contact a of clearing switch 41, wire w3, contact SC3 of *camming* [caming] switch operator 27, wire w7, contact c3 of player selector switch 30a, wire w6, contact a of next-to-last-ball-strike relay 31a, wire w32 and wire w31 into the solenoid. When the next-to-last-ball relay 31a is activated, the contact b thereof serves to pass electrical energy to the activating solenoid of relay 39 provided the last-ball-strike relay 32a is activated, this occurring through the circuitry consisting of power input terminal 42, contact a of clearing switch 41, wire w3, contact b of next-to-last-ball-strike relay 31a, wire w33, contact c of last-ball-strike relay 32a, wire w9, contact c4 of player selector switch 30a, and wire w8 to the activating solenoid of relay 39. Contact c of the next-to-last-ball-strike relay 31a supplies electrical power to the solenoid of relay 38 through the circuitry of power input terminal 42, contact a of clearing switch 41, wire w3, contact c of next-to-last-ball-strike relay 31a, wire w10, contact c5 of player selector switch 30a, and wire w11 to the activating solenoid of relay 38.

As contact SC5 of camming switch operator 27 opens, the electrical power circuit to the solenoid of last-ball-strike relay 32a is opened causing relay 32a to return to its deactivated position, and this in turn opening the circuit providing electrical energy to the solenoid of elay 39 due to the deactivated position of contact c of he last-ball-strike relay 32a. The deactivation of contact d of the last-ball-strike relay 32a at this time has no effect on the energizing of the solenoid of relay 38 since this is now maintained in an activated or energized state by contact c of the next-to-last-ball-strike relay 31a.

The closing of contact SC6 of camming switch operator 27 has no effect on the computer since there is no signal indicating a spare.

The closing of contact SC7 of camming switch operator 27 reactivates the last-ball-strike relay 32a as it was activated as explained above for the third frame. Once activated, contact a serves to maintain the energizing electrical power to the solenoid to in turn maintain the relay 32a in its activated or energized state. Contact b is located within an open circuit at this time due to contact SC4 of camming switch operator 27 being open. Contact c serves to energize the solenoid of relay 39 the same as it was energized previously when contact SC4 of camming switch operator 27 was closed, and which was in turn deactivated or de-energized when contact SC5 of camming switch operator 27 was opened. Contact d, which serves to pass electrical energy to the solenoid of relay 38, actually has no effect at this time due to the fact that the solenoid of relay 38 is already in its energized state through the activated state of contact c of the next-to-last-ball-strike relay 31a.

The closure of contacts SC8 and SC9 of camming switch operator 27 both accomplish the advancement of frame counter 35a, and the corresponding advancement of ball-cam 36a; both contacts SC8 and SC9 making an advancement by virtue of the strike, the same as in the third frame.

As the camming switch operator 27 completes its rotation, the status of the computer is the scored-last-ball counter 40 indicates a "10," while the totalizer 34a indicates a score of "58," and there are four relays activated consisting of the next-to-last-ball-strike relay 31a, the last-ball-strike relay 32a, and relays 38 and 39.

With the strike in the fifth frame, the computer activity is the same as for the fourth frame except that instead of only a score of twenty pins being fed into totalizer 34a, there is a score of thirty pins being added; this additional ten pins being added this time since both relays 38 and 39 on the rotary stepping switch 25. Likewise, the status of the computer at the end of the fifth frame is the same as the end of the fourth frame except for the totalizer 34a now indicating "88" as the score.

With six pins being knocked down on the first ball of the sixth frame, the count fed into the scored-last-ball counter 40 is "6" since six of the ten pin fall signal terminals from pin rack 11 are electrically closed. These same six closed circuit signals or indications are also fed into rotary stepping switch 25 and the appropriate terminals of relays 38 and 39, each of the relays 38 and 39 in turn electrically energizing an additional six contacts on rotary stepping switch 25 for a total pin or score count of "18" being fed into totalizer 34a between the closure of contact CS2 and opening of contact SC3 of camming switch operator 27.

The opening of contact SC3 of camming switch operator 27 opens the electrical circuit supplying electrical power to contact a of the next-to-last-ball-strike relay 31a and wire 32 to maintain the solenoid of the next-to-last-ball-strike relay 31a energized. This deactivation of the next-to-last-ball-strike relay 31a causes the loss of energizing electrical power to relay 39 by the opening of contact a of the next-to-last-ball-strike relay 31a, this relay 39 still being in its activated or energized state at this time since the last-ball-strike relay 32a is still in its activated position. The opening of contact c of the next-to-last-ball-strike relay 31a has no effect at this time insofar as relay 38 is concerned since this is maintained in its energized or activated state by the activated position of the last-ball-strike relay 32a as yet, and more particularly through contact d of the last ball-strike relay 32a.

The closure of contact SC4 of camming switch operator 27 supplies electrical power to activate or energize the solenoid of the next-to-last-ball-strike relay 31a through the activated contact b of the last-ball-strike relay 32a the same as occurred in the fourth frame as described above. This in turn will reactivate relay 39, but will no affect relay 38 which is already in its activated position through contact d of the last-ball-strike relay 32a.

Next in line of the operation is the opening of contact SC5 of camming switch operator 27 which serves to open the circuit conducting electrical power to the solenoid of last-ball-strike relay 32a thereby deactivating this relay. This in turn causes deactivation of the relay 39 by the opening or deactivation of contact c of the last-ball-strike relay 32a, which is required to be in its activated position along with contact b of the next-to-last-ball-strike relay 31a to enable relay 39 to be energized and activated. The deactivation of contact d of the last-ball-strike relay 32a has no effect on the position of relay 38 at this time since relay 38 is maintained in its activate position by the activated location of contact c of the next-to-last-ball-strike relay 31a.

The closing of contacts SC7 and SC8 of camming switch operator 27 has no effect on the computer this time since there is no electrical signal over the strike indicating circuit. A single advancement of the frame counter 35a, and the corresponding advancement of the ball-cam 36a, is accomplished by the closure of contact SC9 of camming switch operator 27.

Thus, the status of the computer after the first ball of the sixth frame is that the scored-last-ball counter 40 indicates a "6" and the totalizer 34a shows a score of "106," while both the next-to-last-ball-strike relay 31a and relay 38 are activated and energized.

The second ball of the sixth frame, knocking the four standing pins down, results in a "4" being indicated on the scored-last-ball counter 40, while eight pins are added to the score for a total of "114" being indicated on the totalizer 34a. On this ball, the opening of contact SC3 of camming switch operator 27 deactivates the next-to-last-ball-strike relay 31a, while contacts SC4 and SC5 of camming switch operator 27 have no effect on the computer, the same as there is no effect by the closing of contacts CS7 and SC8. The closing of contact SC6 results in the last-ball-spare relay 33a becoming activated the same as occurred in the first frame described above, along with the corresponding activation of relay 38, while the closing of contact SC9 of camming switch operator 27 results in the advancement of both the frame counter 35a and the ball-cam 36a.

With seven pins knocked down by the first ball in the seventh frame, the results of operation of the computer are the scored-last-ball counter 40 indicates a "7," while there are fourteen pins added to the score on the totalizer 34a thereby indicating a score of "128," the doubling of the score on this first ball being the result of the last-ball-spare relay 33a being activated for the spare made in the sixth frame. Other than the differences for the specific number of pins downed, the operation of the computer on this ball is the same as described above for the operation of the computer for the first ball of the second frame.

The operation of the computer after the remaining three pins are knocked down by the second ball of the seventh frame is the same as occured above for the second ball thrown in the first and sixth frames; the spare-last-ball relay 33a becoming energized, which in turn energizes relay 38, while a "3" is indicated by the scored-last-ball counter 40 and a score of "131" is indicated by totalizer 34a.

The eighth and ninth frames of this exemplary game result in computer operation the same as in the second and third frames described above, except of course for the differences in the scoring indications. Quickly summarizing, after the first ball of the eighth frame, an "8" is indicated on the scored-last-ball counter 40 while sixteen pins are added to the game score to indicate a total of "147" on totalizer 34a. The second ball results in indications of "1" and "148" respectively, while after the strike in the ninth frame, the indications are "10" and "158" respectively with the last-ball-strike relay 32a activated.

As the signal for advancement of the frame counter 35a is received from the closure of contact SC9 of camming switch operator 27 at the end of the computer operation for the ninth frame, the corresponding advancement of the ball-cam 36a results in the closing of normally open contact b of ball-cam 36a, while at the same time the normally closed contacts d, e, and f of ball-cam 36a are open, thereby preparing the computer for the special scoring conditions of the tenth or last frame of the game. This change in the states of ball-cam 36a in no way affects the energized or activated status of the last-ball-strike relay 32a or the relay 38 since the circuitry holding these relays in their energized or activated status does not include any of the contacts of ball-cam 36a.

Opening of contacts SC3 of camming operator 27 does not affect anything as neither the last-ball-spare relay 33a nor the next-to-last-ball strike relay 31a are energized or activated.

The closing of contact SC4 of camming switch operator 27 serves to supply electrical energizing power to the next-to-last-ball-strike relay 31a through the circuit path of wire w5, contact c2 of player selector switch 30a, wire w4, contact b of last-ball-strike relay 32a, and wire w31 to the solenoid of next-to-last-strike relay 31a.

The opening of contact SC5 of camming switch 27 interrupts the electrical power to de-energize the solenoid of last-ball-strike relay 32a, this power interruption having no effect on the circuitry downstream of the solenoid and connected thereto by wire w26 since contact e of ball cam 36a is open.

Contact SC6 of camming switch operator 27 has no effect at this time since there is no spare signal over wire w23 leading into contact SC6.

The closure of contact SC7 of camming switch operator 27 serves to supply electrical energizing power to the end-of-game-mode relay 37a over the circuit path of wire w25 from pin rack 11, contact SC7 of camming switch operator 27, wire w16, contact c8 of player selector switch 30a, wire w17, contact b of ball-cam 36a, wire w34 to the activating solenoid of end-of-game-mode relay 37a. This relay 37a is maintained in its activated position even after the opening of contact SC7 of camming switch operator 27 by power from wire w3 through the activated contact a of end-of-game-mode relay 37a. It is to be noted here that with contact e of ball-cam 36a being open, no electrical signal passing through contact SC7 of camming switch operator 27 is supplied to the activating solenoid of last-ball-strike relay 32a over wire w26. This is proper and necessary for with the next-to-last-ball-strike relay 31a already in its activated position then both relays 38 and 39 would be activated whereby the score of the first bonus ball after the tenth frame strike would be three times the number of pins knocked down. Since these pins are only to be counted three times when there are two strikes immediately preceding that ball and the pins are also to be counted for the frame in which they are knocked down, such is inapplicable here as the only count for these pins is for the bonus from the ninth frame and for the bonus from the tenth frame, or in other words, only twice.

The closure of contact SC8 of camming switch operator 27 has no effect due to the open contact f of ball-cam 36a.

The closure of contact SC9 effects its usual advancement of the frame counter 35a, and the associated advancement of ball-cam 36a which now causes contacts a and c of ball-cam 36a to close to permit the end-of-game-mode relay 37a to be activated if a spare results from the second throw of the tenth frame. However, in this case, since the end-of-game-mode relay 37a is already activated due to a strike being thrown on the first ball, this closure of contact c of ball-cam 36a is immaterial in this instance. It is to be noted that, if neither a strike is thrown on the first ball of the tenth frame, nor a spare obtained on the second ball of the tenth frame, the ball-cam 36a would have to have an extra advance since there would not be a third ball thrown in the tenth frame; this extra ball skip being necessary to reach the indication of the game being complete. In the case of a strike, the end-of-game-mode relay 37a is activated by the strike signal generated by closure of contact SC7 of camming switch operator 27 passing from wire w17 to contact b of ball-cam 36c, and from there to the activating or energizing solenoid of end-of-game mode relay 37a over [wide] *wire,* w4. In the case of a spare being obtained as the result of the second ball in the tenth frame, end-of-game-mode relay 37a will not have been activated or energized on the first ball, and so will become activated or energized on the second ball by the spare indicating signal from contact SC6 of camming switch operator 27 passing from wire w15 through contact c of ball-cam 36a and on to wire w34 and finally the solenoid of end-of-game-mode relay 37a. In the event the end-of-game-mode relay 37a is not activated due to the lack of a strike and/or spare in the first two balls of the tenth frame, a ball skip signal is obtained by the ball count signal on the second ball of the tenth frame going to frame counter 35a over wire w21 passing through delay relay 36d and closed contact a of ball-cam 36a, then through contact b of end-of-game-mode relay 37a and over wire w21 to frame counter 35a, the purpose of delay relay 36d being to assure two ball count signals passing to frame counter 35a with only one signal. In the event that a strike on the first ball or a spare on the second ball of the tenth frame is scored, the end-of-game-mode relay 37a will already be activated so the delayed ball count signal passing through contact a of ball-cam 36a cannot get through open contact b of end-of-game-mode relay 37b.

With eight pins being knocked down on the second ball thrown in the tenth frame, which is in really the first bonus ball for the strike in the tenth frame, there is a resulting indication of "8" on the scored-last-ball counter 40, and a score of sixteen is added to indicate a total of "194" on the totalizer 34a. This score of sixteen being added comprises eight pins for the second bonus ball for the strike in the ninth frame, and eight pins for the first bonus ball of the strike thrown in the tenth frame.

Opening of contact SC3 of camming switch operator 27 opens the circuit supplying electrical power to maintain the solenoid of next-to-last-ball strike relay 31a activated, which also de-energizes or deactivates relay 38. Closure of contact SC4 has no effect since the electrical signal through contact SC4 of camming switch operator 27 is delivered to deactivated contact b of last-ball-strike relay 32a.

The opening of contact SC5 and closure of contacts SC6, SC7 and SC8, all of camming switch operator 27, have no effect on the computer components on this ball. Closure of contact SC9 gives the usual advancement of frame counter 35a and ball-cam 36a, this advancement of ball-cam 36a retaining contacts a, b and c of ball-cam 36a closed and contacts d, e and f of ball-cam 36a open. This electrical signal from contact SC9 has no effect by passage through delay relay 36d from wire w21 in view of the open activated contact b of the end-of-game-mode relay 37a.

The two pins knocked down on the next ball are merely counted into the totalizer for two since these two pins are counted only once as the second bonus ball for the strike thrown in the tenth frame, thus making a final otal of "196" appear on totalizer 34a along with an ndication of "2" on the scored-last-ball counter 40.

Actuation of contacts SC3, SC4 and SC5 of camming witch operator 27 results in no changes in the status of ny of the computer components on this ball.

The presence of a spare indicating signal being delivered contact SC6 of camming switch operator 27 over wire 23 is not passed on to the last-ball-spare relay 33a for ctivation thereof because of the open contact d of ball-am 36a.

While the actuation of contacts SC7 and SC8 of cam-ning switch operator 27 has no effect on the computer n this ball, the closure of contact SC9 causes the usual dvancement of frame counter 35a and ball-cam 36a indicate the end of the game and to place the switches f ball-cam 36a in the positions shown in the drawings espectively.

The indications on the scored-last-ball counter 40 will ither be cleared upon the closure of contact SC2 of amming switch operator 27 when it is operated for a ubsequent bowler when more than one person is bowling t a time; for example, when more than one player selec-or switch 30 is utilized in one game, or counter 40 will e cleared by the movement of clearing switch 41 in hich case the electrical energy for clearing counter 40 ill pass from power input terminal 42 and through the ower stationary member of contact b of clearing switch 1 to wire w29 and on to counter 40. The totalizer 34a nd end-of-game relay 37a will remain in their respective ndicating and energized states until clearing switch 41 actuated. At that time the electrical power passing rough power input terminal 42 to contact a of the learing switch 41 will be transferred from wire w3 to ire w35, which in turn results in the interruption of nergizing electrical power to the solenoid of end-of-ame-mode relay 37a through wire w3, and supplies elec-ical power for clearing totalizer 34a through wire w35.

FIGURE 4a shows a typical example of a delay relay 6d utilized as described above relative to FIGURES 2, and 4 to obtain a double ball count signal to frame ounter 35a on the second ball of the tenth frame when-ver there is neither a strike on the first ball of the tenth ame nor a spare on the second ball of the tenth frame. his electrical energy or pulse coming from closure of ontact SC9 of rotary camming switch operator 27 over ire w21 passes to coil 100 over wire w101 and to the ovable member of switch 102. The movable member of witch 102 is mechanically connected to an iron core 03 so that there is a delay in actuation of the movable ember of switch 102 to close the circuit with wire w104 hich is in turn connected to contact a of ball-cam 36a, e delay in actuation being controlled by core 103 and rving as the time delay of signal passage through delay lay 36d.

Referring now to FIGURE 5, there is shown another mbodiment of an individual scoring arrangement simi-r to that shown in FIGURE 2 which does not incor-orate an end-of-game mode relay 37a. Basically, this mbodiment still incorporates the individual totalizer 34a, e frame counter 35a, the times-two relay 38 and the mes-three relay 39, it being repeated for the sake of larity that the times-two relay 38 and times-three relay 9 are utilized for each of the player selector switches 0, as shown in FIGURE 4. In this embodiment, there included a ball-cam 136a which is interconnected by mechanical drive to frame counter 35a, the ball-cam 36a having a contact a which is normally open, and ontacts b, c, d and e which are normally closed, the pening and closing of contacts a through e of ball-cam 36a being described in more detail hereinafter.

Also, there is incorporated modified next-to-last-ball-rike relay 131a, last-ball-strike relay 132a, and spare lay 133a, each of which contains a plurality of contacts omprised of a movable and stationary member, the next-o-last-ball-strike relay 131a including contacts a through d, the last-ball-strike relay 132a including contacts a through d, and the spare relay 133a including contacts a through c.

Running from the bottom of FIGURE 5 from left to right are wires w8, w11, w17, w15, w4, w6, w9, w10, w1, w13, w35, w21, w19, and w3, all of which have their unshown ends connected to the same terminals as those wires of the same number appearing in FIGURE 2.

Because of the difference in the number of relay terminals for the individual relays consisting of the next-to-last-ball-strike 131a and spare 133a, and the elimination of the end-of-game-mode relay, a carry-through discussion will be repeated for the second ball thrown in the first, sixth or seventh frame of our exemplary game to show how the spare relay 133a is activated, as well as the operation of the ninth and tenth frames will be repeated with the arrangements shown in FIGURE 5.

As it will be recalled, electrical power is made available at all times to wire w3 from the power input terminal 42 through clearing switch 41, and as a start sequence signal from pin rack 11 passes over wire 13a to a stepper drive 29, the rotary camming switch operator 27 begins to rotate until contact SC1 is closed whereupon electrical power is delivered over wire w3 to wire w22 through closed contact SC1 of rotary camming switch operator 27. Then as contact SC2 closes on camming switch operator 27, a clearing signal is sent to the scored-last-ball counter 40. The next step is the opening of contact SC3 on the rotary camming switch operator 27, which in turn would cause the interruption of electrical energy passing through wire w7 to contact c3 of player selector switch 30a and wire w6 to pass through contacts a of next-to-last-ball-strike relay 131a and spare relay 133a to hold the relays activated. Since neither of the relays is activated, the contacts a of the next-to-last-ball-strike relay 131a and spare relay 133a are open and there is no interruption of electrical power to the energizing coils or solenoids of these relays.

Next is the closing of contact SC4 on camming switch operator 27 which upon closure serves to pass an electric current through wire w5, contact c2 of player selector switch 30a and from there over wire w4 to the stationary member of contact b of the last-ball-strike relay 132a which in turn if the last-ball-strike relay 132d is activated would pass the electrical activating signal to the energizing solenoid of next-to-last-ball-strike relay 131a and contact a thereof over wires w31 and w32. Since the last-ball-strike relay 132a is not activated at this time, there is no passage of the signal to activate the next-to-last-ball-strike relay 131a.

Next, the openings of contact SC5 of the rotary camming switch operator 27 serves to interrupt the flow of electric current from contact SC5 through wire w2 to contact c1 of player selector switch 30a, and from there over wire w1 to the stationary member of contact a, the last-ball-strike relay 132a so as to interrupt the electrical current maintaining the energization of the solenoid of last-ball-strike relay 132a, and since the last-ball-strike relay 132a is not activated, the opening of contact SC5 on camming switch operator 27 has no effect.

The closure of SC6 of camming switch operator 27 transmits the spare indicating electrical signal received at contact SC6 over wire w23 to contact c7 of player selector switch 30a over the wire w14, which in turn passes over wire w15 to energize the solenoid of spare relay 133a causing contacts a and b thereof to close while contact c of spare relay 133a opens. The closure of contact a of spare relay 133a serves to connect the solenoid of relay 133a with electrical power from wire w3 through wire w6 back to contact c3 of the player selector switch 30a; the wire w6 leading to contact c3 of player selector switch 30a being directly connected to wire w3 when player selector switch 30a is in its inactive position, or being connected to the electrical energy of wire w3 through wire w7 and contact SC3 of the rotary camming switch operator 27 when the player selector switch 30a is in its activated position, and thusly, spare relay 133a is held in activated or energized position.

Contact b of spare relay 133a receives electrical energy from w3, through contact e of ball-cam 136a, wire w50, through contact b of spare relay 133a, wire w10 to contact c5 of player selector switch 30a, and from there over wire w11 to the times-two relay 38.

Further describing the action of the rotary camming switch operator 27, on the second ball of the frame when a spare is made, there is no action on the closure of contacts SC7 and SC8 of rotary camming switch operator 27, since these two relays are only involved when a strike signal is received from pin rack 11. The only other action occurring is upon the closure of contact SC9 of camming switch operator 27, which causes an electrical signal to pass from wire w3 through contact SC9 and wire w20 to contact c10 of player selector switch 30a, and from there over wire w21 to the frame counter 35a for advancement thereof; such advancement of frame counter 35a resulting in a concurrent advancement of ball-cam 136a.

Thus, it may be seen upon the scoring of a spare with the embodiment shown in FIGURE 5, the contacts a and b of spare relay 133a are quite similar in operation to the contacts d and b of last-ball-spare relay 33a shown in FIGURE 2. While nothing has been indicated yet about contact c of spare relay 133a, the function and purpose of this will be explained in more detail hereinafter.

Now proceeding to the ninth and tenth frames of our example game with the embodiment shown in FIGURE 5, the ninth frame operation of the rotary camming switch operator 27 through contacts SC3, SC4, SC5 and SC6 is of no effect for there are no activated or energized relays to interrupt the current or electrical energy flow to, nor is the last-ball-strike relay 132a activated so as to pass a signal on to the next-to-last-ball-strike relay 131a upon closure of contact SC4 of camming switch operator 27, the same as there is no spare signal to pass on upon the closure of contact SC6 of camming switch operator 27.

Closure of contact SC7 of rotary camming switch operator 27 passes the strike signal received over wire w25 to contact c8 of player selector switch 30a over wire w16, and from there over wire w17 to the solenoid of last-ball-strike relay 132a which in turn will close contacts a, b, c and d. Closure of contact a causes electrical energy or current to maintain the solenoid of last-ball-strike relay 132a to be activated by receiving electric current from wire w3 through contact SC5 of rotary camming switch operator 27, wire w2, contact c1 of player selector switch 30a, over wire w1 to the stationary member of contact a of last-ball-strike relay 132a.

The closure of contact b of last-ball-strike relay 132a has no effect at this time for contact b is utilized to advance the energizing signal for the next-to-last-ball-strike relay 131a over wire w31 when a signal is received by closure of contact SC4 of rotary camming switch operator 27, and from there through wire w5 to contact c2 of player selector switch 30a, and wire w4 to the stationary member of contact b of last-ball-strike relay 132a. At this time the closure of contact c of last-ball-strike relay 132a has no effect for electrical power comes in from wire w3, contact c of ball-cam 136a, wire w51 to movable member of contact c of last-ball-strike relay 132a, and over wire w52 to the movable member of contact b of next-to-last-ball-strike relay 131a which at the present time is an open contact.

Finally, the closure of contact d of last-ball-strike relay 132a results in a signal coming from the power line wire w3, through contact d of ball-cam 136a, wire w53, to the movable member of contact d of last-ball-strike relay 132a. The signal passes through the stationary member of contact d of last-ball-strike relay 132a to contact c5 of player selector switch 30d over wire w10, and from contact c5 over wire w11 to energize the times-two relay 38.

Next, the closure of contact SC8 of rotary camming switch operator 27 results in the strike signal coming in on wire w25 passing through contact SC8 and over wire w18 to contact c9 of player selector switch 30a, and then over wire w19 through contact b of ball-cam 136a, and from there over wire w54 to the frame counter 35a for the ball skip indication as a result of the strike in the ninth frame. The last item to be indicated in this operation of the rotary camming switch operator 27 is the ball advance operation by the closure of contact SC9 thereof, the electrical signal passing from the contact SC9 over wire w20 to contact c10 of player selector switch 30a, and from there over wire w21 to the frame counter 35a for advancement of the ball-cam 136a. It is to be noted that upon this advancement of the ball-cam 136a to the position ready for the 10–1 ball, or in other words the first ball in the tenth frame, contact b of ball-cam 138a is opened, thereby incapacitating the ball skip signal feature that would result from a strike on the first ball in the tenth frame by the signal passing through contact SC8 of rotary camming switch operator 27. The opening of this circuit is necessary this time for if there is a strike on the first ball in the tenth frame, the result is that a second and third ball will be thrown and, accordingly, there should be no extra ball skip signal for a strike on the first ball thrown in the tenth frame.

Thus, as shown in FIGURE 5 at the end of the ninth frame, as the last-ball-strike relay 132a is activated or in an energized state, the contact b of the ball-cams 136a is open while contact a, c, d and e are closed.

After the strike thrown in the first frame of the tenth frame, nothing happens by the opening of contact SC3 of rotary camming switch operator 27, for there is no electrical power to interrupt since the circuit from contact SC3, through wire w7 to contact c3 of player selector switch 30a, and over wire w6 is open due to the open contact a of spare relay 133a and the open contact a of next-to-last-ball-strike relay 131a. Closure of contact SC4 of rotary camming switch operator 27 passes electrical energy over wire w5, contact c2 of player selector switch 30a, wire w4 to the stationary member of contact b of last-ball-strike relay 132a and from there over wire w31 to activate the next-to-last-ball strike relay 131a. Upon the energizing of the solenoid of next-to-last-ball-strike relay 131a, the relay is held energized by the passage of electrical current through contact SC3 of rotary camming switch operator 27, wire w7, contact c3 of player selector switch 30a, wire w6, and through contact a of next-to-last-ball-strike relay 131a. This closure of contact b of next-to-last-ball-strike relay 131a results in electrical energy from wire w3 passing through contact c of ball-cam 136a, wire w51 to contact c of last-ball-strike relay 132a, wire w52, contact b of next-to-last-ball-strike relay 131a, wire w9, contact c4 of player selector switch 30a, and from there over wire w8 to activate the times-three relay 39. The closure of contact c of next-to-last-ball strike relay 131a serves to connect electrical power from wire w3, contact d of ball-cam 136a, wire w50, to the contact c of next-to-last-ball-strike relay 131a and from there to wire w10 which passes on to supply electrical energizing power to the times-two relay 38; it being noted that the times-two relay 38 is already activated due to the supply of electric current from contact d of ball-cam 136a, wire w53 and contact d of the last-ball-strike relay 132a which is still in an activated or energized condition.

The opening of contact SC5 of rotary camming switch operator 27 serves to interrupt the flow of electrical power from there over wire w2, to the contact c1 of player selector switch 30a, and from there over wire w1 to contact a of last-ball strike relay 132a, thereby interrupting the flow of electric energy to the solenoid holding last-ball-strike relay 132a in its energized position, and thereby serving to de-energize the relay, thereby opening contacts , b, c and d of last-ball-strike relay 132a. Nothing occurs pon the closure of contact SC6 of the rotary camming vitch operator 27 since there is no spare signal passing ver wire w23.

The closure of contact SC7 of rotary camming switch perator 27 serves to pass the strike signal passing over ire w25 to activate the last-ball-strike relay 132a, so ıat both the next-to-last-ball-strike relay 131a and the ıst-ball-strike relay 132a are energized and both the mes-two relay 38 and times-three relay 39 are ener- ized.

There is no ball skip signal *received* [reecived] by the osure of contact SC8 of rotary camming switch operator 7, since the ball skip signal passing from contact c9 of layer selector switch 30a over wire w19 cannot pass thru ıe open contact b of ball-cam 136a. However, the clo- ıre of contact SC9 of rotary camming switch operator 7 does produce a ball advancing signal to frame counter 5a by passing the signal from the contact SC9 over wire 20, through contact c10 of player selector switch 30a, nd over wire w21 to the frame counter 35a. It is to be oted that as the frame counter 35a advances it causes and d of ball-cam 136a to open thereby opening the rcuit energizing the times-three relay 39, this being ap- ropriate even though the last two balls thrown were rikes since the second ball in the tenth frame is to be bonus ball with only a double count, one count being or the second bonus ball of the strike in the ninth frame nd the other bonus count being for the first bonus count f the strike on the tenth frame.

The opening of contact d of ball-cam 135a has no ef- ect at this time since the times-two relay 38 will main- ıin its energized state by the electric current flowing om power wire w3 through contact e of ball-cams 136a, ire w50, and contact c of next-to-last-ball-strike relay 31a which is still in an activated or energized state; this ıaintaining the energization of the times-two relay 38 eing appropriate since the second ball of the tenth frame ill be counted twice as described above.

As the second ball of the tenth frame is thrown and ıe eight pins are knocked down, the opening of contact C3 of rotary camming switch operator 27 causes the ext-to-last-ball-strike relay 131a to open or become de- ıergized, while the closure of contact SC4 results in the ext-to-last-ball-strike relay 131a becoming re-energized y the signal passing through the energized last-ball-strike elay 132a. The opening of contact SC5 of rotary cam- ıing switch operator 27 serves to open or de-energize the ıst-ball-strike relay 132a so that we end up with only ıe next-to-last-ball-strike relay 131a being energized. here is no further activity by the rest of the cycle of otary camming switch operator 27 except for the ball dvance signal generated by the closure of contact SC9 hich in turn delivers the signal over wire w1 to frame ounter 35a; this advancement of frame counter 35a serv- ıg to close contact a and open contact e of ball-cam 136a; ıe purpose of the opening of contact e of ball-cam 136a eing to open the circuit through which electrical power supplied to energize the times-two relay 38 through ther contact c of next-to-last-ball strike relay 131a or ontact b of the last-ball-spare relay 133a, should either f these relays be activated or energized. The purpose f contact a of ball-cam 136a closing upon advancement f the frame counter 35a from ball 10–2 can now clearly e seen, for closure of this contact a of ball-cam 136a erves to deliver electrical power from power line w3 ırough the contact a of ball-cam 136a, wire w55 to con- ıct c of the last-ball-spare relay 133a and from there to ontact d of the next-to-last-ball-strike relay 131a, and ı turn from there over wire w56 back to the frame ounter 35a. It will be noted that this circuitry is arranged that if upon the advancement of the frame counter 5a and ball-cam 136a from the second ball of the tenth ame with neither one of the relays 131a or 133a acti- ated or energized, there will be a ball skip signal passed to frame counter 35a thereby skipping the signal or indi- cation that a ball 10–3 is to be thrown. In other words, if a strike were not made on the first throw of the tenth frame, or a spare were not made on the second throw of the tenth frame, then accordingly, no third ball in the tenth frame is to be thrown; and there is provided a skip- ping signal to the frame counter 35a to bypass such.

However, in this case, since the next-to-last-ball-strike relay 131a is activated or energized, its contact d is open, thereby preventing this special skipping signal passing on to frame counter 35a.

As a result, the computer is now set for the throwing of the third ball of the tenth frame which picks up the last two standing pins resulting in the indication of the end of the game by any appropriate signal means to frame counter 35a or any other desired type indicator.

Referring now to FIGURE 6, there is shown a still further embodiment of this invention in which the relays 38 and 39 may be replaced by a timing stepper unit to add the bonus counts on pinfall when appropriate. In this ar- rangement, the thirty position stepper 25 of FIGURE 2 is replaced with a modified thirty position stepper 125 in which the contacts 1 through 10, which are connected to the terminals 1 through 10 on the pin rack 11, are in turn relocated from the arrangement of FIGURE 2 so as to be located in the first portion of the sweep of the rotating contact arm. Each of the contacts 1 through 10 are in turn connected to a relative corresponding contact in each of the groups of contacts 11 through 20 and 21 through 30.

The ten position stepper 26 of FIGURE 2 is replaced by a ten position stepper 126, the difference being that the ten contacts are rearranged spacewise so as to coincide with the spacing of contacts 1 through 10 on thirty posi- tion stepper 125.

The relays 38 and 39 of FIGURE 2 are replaced by a timing stepper 128, having three arcuate contact bars 128a, 128b and 128c. The first contact bar 128a receives electrical current or energy from switch 53 on the pin rack 11 over wire 113, while the second segment 128b receives electrical energy from the player selector switch 30 over wire w11, this electrical energy over wire w11 being the same that would energize and retain energization of relay 38 as explained above relative to FIGURE 2. The third segment 128c is energized over wire w8 by the same electrical current as energizes relay 39 above rela- tive to FIGURE 2.

In operation, this embodiment performs similar to the other embodiments in that electrical energy passes through switch S3, which closes upon the lowering of pin rack 11, and through wire 13a to start stepper drive 29 rotating the sweep arms or contacts on the thirty position stepper 125, ten position stepper 126, and timing stepper 128, all of which are interconnected by mechanical drive 28. Mechanical drive 28 also drives rotary camming switch 27 (FIGURE 3) so that upon closure of SC1 on rotary camming switch 27, electrical energy is supplied to stepper drive 29 through wire w22 as before. As the rotating or sweep arm of timing stepper 128 rotates it passes on the electric current coming into arcuate contact 128a from switch S3 to switch S4 through wire 114. This current passes from switch S4 to the microswitches 1a through 10a on pin rack 11 over either wire 13c or 13d as set forth above. This current then passes on to the appropriate ter- minals 1 through 10 to indicate which pins are down on that particular ball as set forth above, the terminals 1 through 10 of pin rack 11 being connected to the terminals 1 through 10 of both the thirty position stepper 125 and the ten position stepper 126.

As the sweep arms of thirty position stepper 125, ten position stepper 126 and timing stepper 128 rotate through the arcuate distance represented by arcuate contact 128a, the actual count of the pins knocked down on the ball being scored passes on to the scored last ball counter 40 from the ten position stepper 126 over wire w30, while the actual count of the pins knocked down on the ball being scored passes on to the totalizer 34a over wire w12, contact c6 of player selector switch 30a, and wire w13. The addition of a bonus count to double the score of the number of pins knocked down on the ball being scored is effected by the bonus electrical current passing to arcuate contact 128b of timing 128 over wire w11 (which is the same as energizes relay 38 in the embodiments described above). In this embodiment, the current coming into arcuate contact 128b over wire w11 passes through the sweep arm of timing stepper 128, wire 114, switch S4, appropriate wire 13c or 13d, microswitches 1a through 10a to the appropriate terminals 1 through 10 of the thirty position stepper 125. Since these terminals are in turn connected to terminals 11 through 20, the two times or double bonus count is added to totalizer 34a through wire w12 and subsequent connections as set forth above.

The further addition of a bonus count to triple the score of the number of pins knocked down on the ball being scored is effected by the bonus electrical current passing to arcuate contact 128a of timing stepper 128 over wire w8, and which is the same current as energizes relay 39 in the embodiments described above. In this embodiment, the current coming into arcuate contact 128c over wire w8 passes through the sweep arm of timing stepper 128, wire 114, switch S4, appropriate wire 13c or 13d, microswitches 1a through 10a to the appropriate terminals 1 through 10 of the thirty position stepper 125. Since these terminals are in turn connected to terminals 21 through 30, the three times or triple bonus count is added to totalizer 34a through wire w12 and subsequent connections as set forth above.

Thus, with the embodiment of the invention set forth in FIGURE 6, it can be seen that even though the doubling and tripling relays 38 and 39 are replaced by the timing stepper 128 and the associated wiring changes, there is still presented at all times on the totalizers 34 the score that would be the final score for that bowler for that game if all the other balls thrown for that game scored zero, this being so regardless of what the status relative to bonus scoring is for the two immediately previous bells thrown.

While they do not form a part of this invention, it is to be recognized that appropriate devices for eliminating the pin fall for a specific ball in the case of a bowler fouling by travel over the foul line may be incorporated, as well as it is to be understood that a team totalizer may be incorporated if desired, and an arrangement for switching the scoring from one alley to another as the bowlers alternate alleys, as well as from one bowler to another; such devices of the type shown in Millman at al. cited above, or any other appropriate type device.

In summary, it can be seen that there is provided by this invention an automatic bowling score computer in which actual and up to date numerical scores are kept and maintained for any number of individual bowlers, the indicated score for any bowler being the final score for that game should all subsequent or following balls thrown for that game score zero, as well as this objective and result are met with a minimum of equipment, and hence expense, for a device of this type.

While particular embodiments of this invention have been shown and described, it will be obvious to those skilled in the art that various changes and modifications may be made without departing from the invention and it is intended to cover in the appended claims all such modifications and equivalents as fall within the true spirit and scope of this invention.

What is claimed is:

1. A bowling score computer for connection to at least one bowling pin spotting machine for maintaining and presenting an up-to-date score for each of a plurality of bowlers with a minimum of storage and programming requirements comprising:

a rotary camming switch means having at least ten positions which are adapted and arranged to receive signals from the pin spotting machine as to whether each pin is knocked down or not on each ball thrown;

an individual scoring totalizer connected to said rotary camming switch means for each of the plurality of bowlers;

first means interposed between said individual scoring totalizers and said rotary camming switch means for controlling the connections so that only one totalizer can be operated at any one time;

a first relay means for each of the plurality of the bowlers;

means energizing said first relay means upon receipt of a signal indicating the attainment of a spare on the second ball of a frame and maintaining said first relay means energized until the pins knocked down on the first ball of the immediately next subsequent frame for that bowler is scored in said totalizer for that bowler;

a second relay means for each of the plurality of the bowlers;

means energizing said second relay means upon receipt of a signal indicating the attainment of a strike on the first ball of a frame and maintaining said second relay means energized until the pins knocked down on the first ball of the immediately next subsequent frame for that bowler is scored in said totalizer for that bowler;

a third relay means for each of the plurality of the bowlers;

means energizing said third relay means in conjunction with the scoring for any pins knocked down on the first ball thrown after a strike by that bowler and maintaining said third relay means energized until the pins knocked down on the second ball thrown by that bowler after a strike is scored in said totalizer for that bowler;

second means interconnected with said relay means and said rotary camming switch means whereby when any one of said first, second and third relay means is energized during the scoring of pins knocked down on one ball the actual pin count added to said totalizer is doubled, and when both said second and third relay means are energized during scoring of pins knocked down on one ball the actual pin fall added to said totalizer is tripled, said doubled or tripled pinfall count added to the totalizer with only one complete revolution of the rotary camming switch means per bowling ball thrown the same as occurs each time a ball is thrown when the direct count of pins knocked down is added to the totalizer by only one complete revolution of the rotary camming switch means without any doubled or tripled bonus score count involved;

and control means interrupting said interconnecting means between said relay means and said rotary camming switch means whereby the scoring count being added to said totalizer cannot be tripled after the first ball scored in the tenth frame of a game and cannot be doubled after the second ball scored in the tenth frame of a game.

2. A bowling score computer for connection to at least one bowling pin spotting machine for maintaining and presenting an up-to-date score for each of a plurality of bowlers with a minimum of storage and programming requirements comprising:

a thirty position rotary camming switch, ten positions of which are adapted and arranged to receive signals from the pin spotting machine as to whether each pin is knocked down or not on each ball thrown;

an individual scoring totalizer connected to said rotary camming switch for each of the plurality of bowlers;

first means interposed between said individual scoring totalizers and said rotary camming switch for controlling the connections so that only one totalizer can be operated at any one time;

a first relay means for each of the plurality of the bowlers which becomes energized upon attainment of a spare on the second ball of a frame and remains energized until the pins knocked down on the first ball of the immediately next subsequent frame for that bowler is scored in said totalizer for that bowler;

a second relay means for each of the plurality of the bowlers which becomes energized upon attainment of a strike on the first ball of a frame and remains energized until the pins knocked down on the first ball of the immediately next subsequent frame for that bowler is scored in said totalizer for that bowler;

a third relay means for each of the plurality of the bowlers which becomes energized after the pins knocked down on the next subsequent ball thrown after a strike by that bowler is scored and remains energized until the pins knocked down on the second ball thrown by that bowler after a strike is scored in said totalizer for that bowler;

a first and a second multiplication relay means of ten contacts with each contact having a pair of terminals, the first terminals of the ten contacts of both said multiplication relay means adapted and arranged to receive signals from the pin spotting machine as to whether each pin is knocked down or not on each ball thrown, the second terminals of the ten contacts of said first multiplication relay means connected to another ten positions of said thirty position rotary camming switch, the second terminals of the ten contacts of said second multiplication relay means connected to the final ten positions of said thirty position rotary camming switch;

actuation means for said first and second multiplication relay means interconnected with said first, second and third relay means whereby when any one of said first, second or third relay means is energized during the scoring of pins knocked down on one ball [of] said first multiplication relay means is energized so that the actual pin count added to said totalizer is doubled, and when both said second and third relay means are energized during the scoring of pins knocked down on one ball both said first and second multiplication relay means are energized so that the actual pin count added to said totalizer is tripled;

and control means interrupting energization of said first and second multiplication relay means whereby the second multiplication relay means cannot be energized after the first ball scored in the tenth frame so that the scoring count being added to said totalizer cannot be tripled after the first ball scored in the tenth frame of a game and the first multiplication relay means cannot be energized after the second ball scored in the tenth frame so that the scoring count being added to said totalizer cannot be doubled after the second ball scored in the tenth frame of a game.

3. A bowling score computer for connection to at least ne bowling pin spotting machine for maintaining and resenting an up-to-date score for each of a plurality of owlers with a minimum of storage and programming reirements comprising:

a thirty position rotary camming switch, the first ten positions of which are adapted and arranged to receive signals from the pin spotting machine as to whether each pin is knocked down or not on each ball thrown, the second ten positions interconnected to their respective first ten positions, and the third ten positions interconnected to their respective first ten positions;

an individual scoring totalizer connected to said rotary camming switch for each of the plurality of bowlers;

first means interposed between said individual scoring totalizers and said rotary camming switch for controlling the connections so that only one totalizer can be operated at any one time;

a first relay means for each of the plurality of the bowlers which becomes energized upon attainment of a spare on the second ball of a frame and remains energized until the pins [are] knocked down on the first ball of the immediately next subsequent frame for that bowler [is] *are* scored in said totalizer for that bowler;

a second relay means for each of the plurality of the bowlers which becomes energized upon attainment of a strike on the first ball of a frame and remains energized until the pins knocked down on the first ball of the immediately next subsequent frame for that bowler [is] *are* scored in said totalizer for that bowler;

a third relay means for each of the plurality of the bowlers which becomes energized after the pins knocked down on the next subsequent ball thrown after a strike by that bowler is scored and remains energized until the pins knocked down on the second ball thrown by that bowler after a strike [is] *are* scored in said totalizer for that bowler;

a three segmented timing stepper means controlling the connections between the thirty position rotary camming switch and the selected individual scoring totalizer, means operating said first timing stepper means segment to permit the total number of pins knocked down on each ball thrown as indicated from the first ten positions of the thirty position rotary camming switch to be added into the selected individual scoring totalizer, means operating said second timing stepper means segment to permit the total number of pins knocked down on each ball thrown as indicated from the second ten positions of the thirty position rotary camming switch to be added into the selected individual scoring totalizer when any one of said first, second and third relay means is energized whereby the actual pin fall added to the selected individual scoring totalizer is doubled, and means [of] operating said third timing stepper means segment to permit the total number of pins knocked down on each ball thrown as indicated from the third ten positions of the thirty position rotary camming switch to be added into the selected individual scoring totalizer when both said second and third relay means are energized whereby the actual pin fall added to the selected individual scoring totalizer is tripled;

and control means interrupting operation of said second and third timing stepper means segments whereby the third timing stepper means segment is inoperative after the first ball scored in the tenth frame so that the scoring count being added to the selected individual scoring totalizer cannot be tripled after the first ball scored in the tenth frame of a game and the second timing stepper means segment is inoperative after the second ball scored in the tenth frame so that the scoring count being added to the selected individual scoring totalizer cannot be doubled after the second ball scored in the tenth frame of a game.

4. A bowling score computer as claimed in claim 1 in combination with a bowling pin spotting machine, and each of said at least ten positions of the rotary camming switch means connected to one of the pin positions in said bowling pin spotting machine.

5. The combination of claim 4 including a sensing means on said bowling pin spotting machine for determining when a strike is made on the first ball of a frame, said sensing means connected to said computer for passing a signal to the computer when a strike is sensed.

6. The combination of claim 4 including a sensing means on said bowling pin spotting machine for determining when a spare is made on the second ball of a frame, said sensing means connected to said computer for passing a signal to the computer when a spare is sensed.

7. A bowling score computer as claimed in claim 1 including a frame counting means, said frame counting means operatively connected to said control means for operation thereof.

8. A bowling score computer as claimed in claim 1 including a programming cam means operating in unison with said rotary camming switch means with one complete revolution per bowling ball thrown and having at least five operable program control contacts that are operated during each revolution of said programming cam means; one of said program control contacts de-energizing the first and third relay means when either is energized: another of said program control contacts controlling said energizing of said third relay means when said second relay means is energized; the third said program control contact de-energizing said second relay means when it is energized; said fourth program control contact controlling said energizing of said first relay means upon attainment of a spare on the second ball of a frame; and, the fifth said program control contact controlling said energizing of said second relay means upon attainment of a strike on the first ball of a frame.

9. A bowling score computer as claimed in claim 8 wherein said five program control contacts of said programming cam means operate sequentially in the order cited.

10. A bowling score computer as claimed in claim 1 wherein said first means is a multiple contact player selector switch means for each of the plurality of bowlers; each said player selector switch means having an energized and an unenergized position and adapted to permit operation and control changes in the first, second and third relay means and individual scoring totalizer interconnected with that player selector switch means when that player selector switch means is in its energized position while retaining any of the first, second and third relay means in their energized positions when that player selector switch means is in its unenergized position.

*11. A bowling score computer for connection to at least one bowling pin spotting machine for maintaining and presenting an up-to-date score for each of a plurality of bowlers with minimum of storage and programming requirements comprising:*

*a signal control means having a cyclic operational mode and having at least ten parallel input signal positions which are adapted and arranged to receive signals from the pin spotting machine as to whether each pin is knocked down or not on each ball thrown;*

*an individual scoring totalizer connected to said signal control means for each of the plurality of bowlers;*

*a first means interposed between said individual scoring totalizers and said signal control means for controlling the connections so that only one totalizer can be operated at any one time;*

*a first bistable means for each of the plurality of the bowlers, said first bistable means having a first and a second signal control mode, said first signal control mode indicating the lack of spare attainment for that bowler on the last ball thrown by that bowler and said second signal control mode indicating the attainment of a spare on the last ball thrown by that bowler;*

*means placing said first bistable means into its said second signal control mode upon receipt of a signal indicating the attainment of a spare on the second ball of a frame and maintaining said first bistable means in its second signal control mode until the pins knocked down on the first ball of the immediately next subsequent frame for that bowler is scored in said totalizer for that bowler;*

*a second bistable means for each of the plurality of the bowlers, said second bistable means having a first and a second signal control mode, said first signal control mode indicating the lack of a strike attainment for that bowler on the last ball thrown by that bowler and said second signal control mode indicating the attainment of a strike on the last ball thrown by that bowler;*

*means placing said second bistable means into its said second signal control mode upon receipt of a signal indicating the attainment of a strike on the first ball of a frame and maintaining said second bistable means in its second signal control mode until the pins knocked down on the first ball of the immediately next subsequent frame for that bowler is scored in said totalizer for that bowler;*

*a third bistable means for each of the plurality of the bowlers, said third bistable means having a first and a second signal control mode, said first signal control mode indicating the lack of a strike attainment on the next to the last preceding ball thrown by that bowler and said second signal control mode indicating the attainment of a strike on the next to the last preceding ball thrown by that bowler;*

*means placing said third bistable means into its said second signal control mode in conjunction with the scoring for any pins knocked down on the first ball thrown after a strike by that bowler and maintaining said third bistable means in its second signal control mode until the pins knocked down on the second ball thrown by that bowler after a strike is scored in said totalizer for that bowler;*

*a second means interconnected with said bistable means and said signal control means whereby when any one of said first, second, and third bistable means is in a second signal control mode during the scoring of pins knocked down on one ball the actual pin count added to said totalizer is doubled, and when both said second and third bistable means are in their second signal control mode during scoring of pins knocked down on one ball the actual pin fall added to said totalizer is tripled, said doubled or tripled pin fall count added to the totalizer with only one complete operation cycle of the signal control means per bowling ball thrown, the same as occurs each time a ball is thrown when the direct count of pins knocked down is added to the totalizer by only one complete operation cycle of the signal control means without any doubled or tripled bonus score count involved; and*

*tenth frame control means interrupting said interconnected second means whereby the scoring count being added to said totalizer cannot be tripled after the first ball scored in the tenth frame of a game and cannot be doubled after the second ball scored in the tenth frame of a game.*

References Cited

The following references, cited by the Examiner, are of record in the patented file of this patent or the original patent.

UNITED STATES PATENTS

| | | | |
|---|---|---|---|
| 2,590,444 | 3/1952 | Millman et al. | |
| 2,643,884 | 6/1953 | Koči. | |
| 3,124,355 | 3/1964 | Mentzer et al. | 273—54 |
| 3,202,803 | 8/1965 | Markstrom | 235—92 |
| 3,250,534 | 5/1966 | Watts | 273—54 |

ANTON O. OECHSLE, Primary Examiner

U.S. Cl. X.R.

235—92 GA